(12) United States Patent
Jurkovich et al.

(10) Patent No.: US 7,404,262 B2
(45) Date of Patent: Jul. 29, 2008

(54) HEAT-MOISTURE CONTROL IN AGRICULTURAL-PRODUCT PRODUCTION USING MOISTURE FROM WATER VAPOR EXTRACTION

(75) Inventors: John C. Jurkovich, Edina, MN (US); Mark R. Oliver, Eagan, MN (US)

(73) Assignee: Pesco, Inc., Hopkins, MN (US)

( * ) Notice: Subject to any disclaimer, the term of this patent is extended or adjusted under 35 U.S.C. 154(b) by 510 days.

(21) Appl. No.: 11/026,710

(22) Filed: Dec. 30, 2004

(65) Prior Publication Data

US 2006/0093713 A1   May 4, 2006

Related U.S. Application Data

(63) Continuation-in-part of application No. 10/963,954, filed on Oct. 12, 2004.

(51) Int. Cl.
*F26B 7/00* (2006.01)
(52) U.S. Cl. .......................................... 34/381; 34/138
(58) Field of Classification Search ................. 34/380, 34/138, 381
See application file for complete search history.

(56) References Cited

U.S. PATENT DOCUMENTS

| | | |
|---|---|---|
| 3,438,780 A | 4/1969 | Singer |
| 3,861,058 A | 1/1975 | Whelan |
| 4,163,469 A | 8/1979 | English |
| 4,211,071 A | 7/1980 | Wyatt |
| 4,357,358 A | 11/1982 | Schanze |
| 4,447,965 A | 5/1984 | Bray |
| 4,659,299 A | 4/1987 | Pierik |
| 4,674,418 A | 6/1987 | Schafer |
| 4,929,163 A | 5/1990 | Volk |
| 4,935,874 A | 6/1990 | Volk |
| 5,486,102 A | 1/1996 | Ettie et al. |
| 5,570,517 A | 11/1996 | Luker |
| 5,744,186 A | 4/1998 | Harrison |
| 5,871,802 A | 2/1999 | Gao et al. |
| 6,330,982 B1 | 12/2001 | Yu et al. |

OTHER PUBLICATIONS

Badger State Ethanol, "Dry Mill Process", web address: http://www.badgerstateethanol.com/downloads/drymillprocess.pdf, (downloaded Aug. 17, 2004). (1 page).

(Continued)

*Primary Examiner*—S. Gravini
(74) *Attorney, Agent, or Firm*—Charles A. Lemaire; Lemaire Patent Law Firm, P.L.L.C.

(57) ABSTRACT

A method and apparatus for agricultural product production with heat and moisture control with optional heat and moisture recovery. Some embodiments transfer heat and moisture from a warm, moist exhaust air stream to incoming agricultural material, steam condition the material, pelletize the material into warm pellets, cool the warm pellets with make-up air to produce the warm, moist exhaust air used to transfer heat to the incoming material and to produce cooled pellets, wherein the cooled pellets are at a temperature lower than the warm moist air. In some embodiments, the system includes counter-flow devices to transfer heat and moisture. In some embodiments, a controller is used to adjust system devices and overall system flow. In some embodiments a water sprayer, to moisten agricultural product when the product is over dry, and an air flow controller, to slow air flow through the pellet dryer/cooler when ambient temperatures are dryer/cooler, are provided.

38 Claims, 11 Drawing Sheets

OTHER PUBLICATIONS

Badger State Ethanol, "Ethanol Production Process", web address: http://www.badgerstateethanol.com/process.htm, (Copyright 2001). (2 pages).

Barr-Rosen Ltd, "Swirl Flluidizer", web address: http://www.barr-rosin.com/english/products/b12.html, (downloaded Aug. 6, 2004). (2 pages).

Barr-Rosen Ltd., "Column Dryer", web address: http://www.barr-rosin.com/english/products/b6.html, (downloaded Aug. 6, 2004). (2 pages).

Barr-Rosen Ltd., "Ring Dryer", web address: http://www.barr-rosin.com/english/products/b2.html, (downloaded Aug. 6, 2004). (5 pages).

Barr-Rosen Ltd., "Flash Dryer", web address: http://www.barr-rosin.com/english/products/b1.html, (downloaded Aug. 6, 2004). (3 pages).

Barr-Rosen Ltd., "Fluid Bed Dryer", web address: http://www.barr-rosin.com/english/products/b5.html, (downloaded Aug. 6, 2004). (3 pages).

Bliss Industries, Inc., "Eliminator Combo Rotary Feeders & Magnet Adapters", web address: http://www.bliss-industries.com/pdfs/rotaryfd.pdf, (downloaded Aug. 17, 2004). (4 pages).

Bliss Industries, Inc., "OP-FLO Coolers The circular solution to counterflow cooling", web address: http://www.bliss-industries.com/pdfs/cooler.pdf, (downloaded Aug. 17, 2004). (6 pages).

Bliss Industries, Inc., "Pioneer Pellet Mill", web address: http://www.bliss-industries.com/pdfs/peltmill.pdf, (downloaded Aug. 17, 2004). (6 pages).

Corn Products International, Inc, "Corn Wet Milling Process Diagram", web address: http://www.cornproducts.com/WetMillingProcess.shtml http://www.cornproducts.com/images/Fermentation.gif, (downloaded Aug. 17, 2004).(1 page).

Natural Corn-to-Ethanol Research, "Flow Diagram", web address: http://www.siue.edu/ETHANOL/flow.html, (downloaded Aug. 18, 2004). (1 page).

Pioneer, "Corn Wet Milling Information", web address: http://www.pioneer.com/media/industryselect/about_industryselect/wet_milling_brochure.pdf, (2003/2004). (2 pages).

Renewable Fuels Association, "How Ethanol is Made", web address: http://www.ethanolrfa.org/prod_process.html, (Copyright 2000). (3 pages).

Scott Equipment Company, "A.S.T. Drying System", web address: http://www.scottequipment.com/drying/ast.dryer/pdf/scotteco.astdryer.ebrochure.pdf, (downloaded Aug. 17, 2004). (6 pages).

STILLSPIRITS, "FAQ's Yeast & Fermentation", web address: http://www.stillspirits.com/wawcs016220/6220.html, (downloaded Aug. 18, 2004). (4 pages).

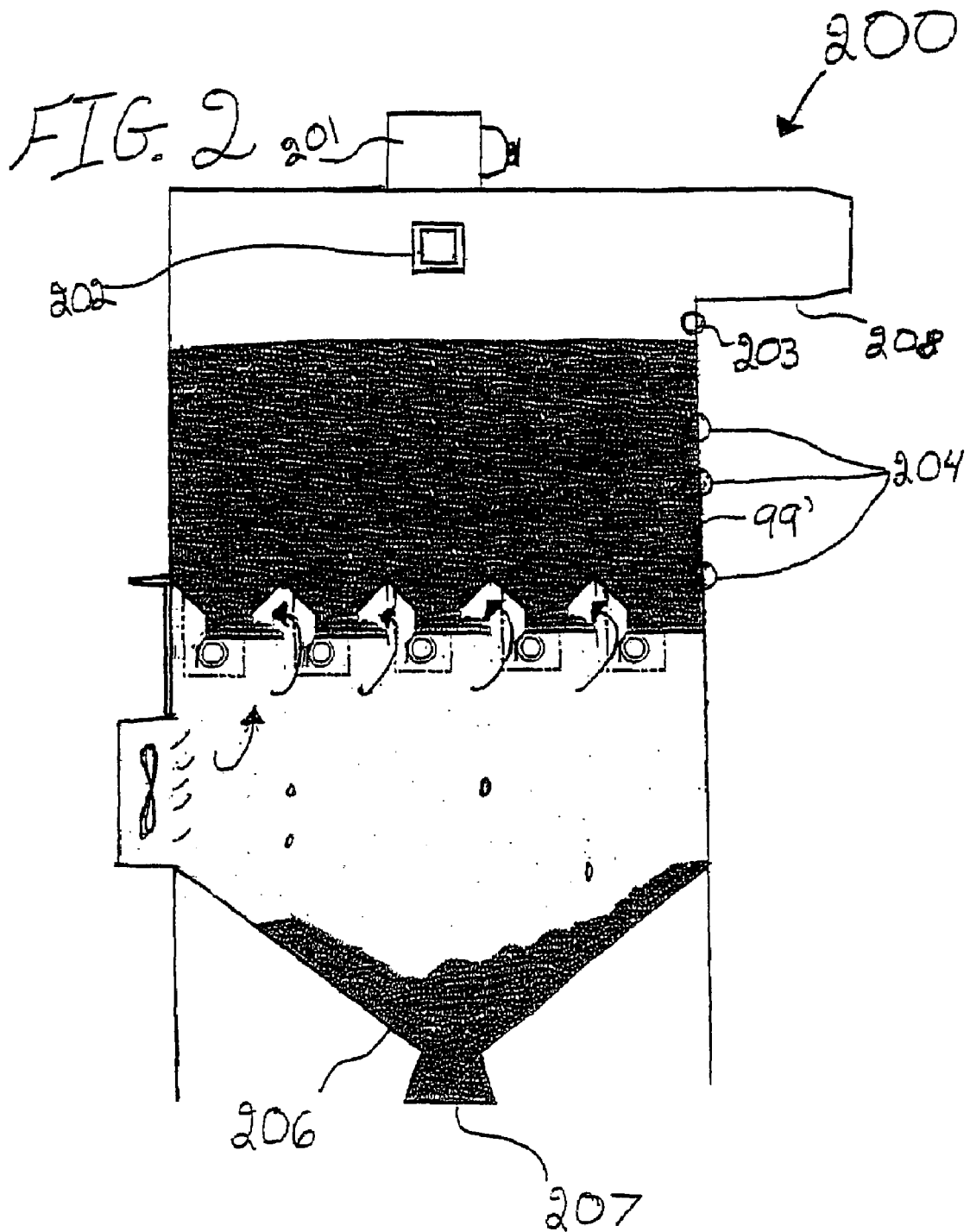

US 7,404,262 B2

HEAT-MOISTURE CONTROL IN AGRICULTURAL-PRODUCT PRODUCTION USING MOISTURE FROM WATER VAPOR EXTRACTION

RELATED APPLICATIONS

This is a continuation-in-part of U.S. patent application Ser. No. 10/963,954, filed Oct. 12, 2004, entitled "AGRICULTURAL-PRODUCT PRODUCTION WITH HEAT AND MOISTURE RECOVERY AND CONTROL", by the inventors of the present invention, which application is incorporated by reference.

FIELD OF THE INVENTION

This invention relates generally to agricultural-product processing and more particularly to heat and moisture control in a continuous, quasi-continuous, batch, or other process. The systems and methods presented by this invention may be used in pelletizing materials such as grain, corn, wheat, wood, and other such agricultural products; ethanol production from corn or other materials; wet corn milling; steam-flaking of feedstuffs; sugar processing; etc.

BACKGROUND OF THE INVENTION

Basic methods for processing agricultural products using heat are generally known. Agricultural-product processing, for instance making pelleted feed for livestock, can typically include grinding raw material, storing material, mixing ration additives to create mash, steam conditioning, pelletizing, and pellet cooling and drying. It is sometimes desirable to dry and cool pellets output from this system to within about six degrees Celsius (about ten degrees Fahrenheit) of ambient-air temperature in order to control product moisture in storage bins, and thus prevent growth of mold.

Before entering a pellet mill, mash has generally been steam conditioned by injecting, for example, five points of steam into the mash. One point of steam means adding an amount of steam equal to one percent of the weight of the product mash being heated. Steam conditioning is also useful in the agricultural-production process in that it may sterilize the agricultural product, cook the product to make nutrients more available, and/or gelatinize starch in the product so the product is better capable of sticking together.

Climate changes affect the output from an agricultural-product processor. Industry trends have shown that, when ambient air temperatures are higher, production is increased and the production process is more cost efficient. The raw material and ambient air, used in the process, are already at a higher temperature when input into the system, thereby cutting down on energy costs because the product requires less additional heat than is necessary when raw material and ambient air temperatures are cooler, such as in winter months.

Similar processes involving grinding raw material, steam conditioning/heating, cooling and drying are also used in ethanol production, wet corn milling, sugar production, wood-pellet production (e.g., pellets for burning in home wood-pellet-burning stoves to generate residential heat), and other processing of agricultural products. These processes typically include at least some of the above functions, in particular steam moisturizing and conditioning/heating.

In U.S. Pat. No. 4,659,299 (incorporated herein by reference), a system is described in which "pre-heated mash is pelleted to thereby form warm pellets. Thereafter, the warm pellets are cooled by ambient air and the ambient air is heated by the heat from the warm pellets. The heated ambient air is used to pre heat the mash." "The airflow path is provided from the ambient air inlets through the dryer/cooler, through the belt conveyor to cool and remove moisture from the warm pellets and pick up heat, through the conveyor to pre-heat the mash and then exits the air dryer/cooler through the warm air conduit. The belt conveyor conveys the mash through the warm air in the air flow path to pre-heat the mash."

This U.S. Pat. No. 4,659,299 starts to address energy use and efficiency problems, but the belt conveyer mechanism used in this invention for cooling the pellets does not address inefficiencies related to a co-flow system or cross-flow system or an uneven dispersion of pellets. Because U.S. Pat. No. 4,659,299 describes a single cross-flow system using inefficient heat transfer (typically, a belt or tray requires high air flow and is prone to channeling, wherein most of the air goes through the spots with fewest pellets and least resistance), the system is typically unable to cool the agricultural product to a temperature below that of the intermediate moist exhaust air. The exhaust air is typically unable to reach a temperature higher than that of the pellet output. The dispersion of pellets created by the belt conveyor in this patent leaves the problem of an uneven spread of pellets. If the pellets are not spread uniformly in the cooling process, the air used to cool the product will travel through the path of least resistance, or where the fewest number of pellets are located. This will cause an inconsistent and inefficient cooling and drying of the pellets, and a lower quality product output. The belt-conveyor cooler is now usually considered obsolete technology that is generally being replaced in the industry by more efficient counterflow devices.

U.S. Pat. No. 4,929,163 (incorporated herein by reference) describes a system "which utilizes moisture in its liquid phase, i.e., water, and heat in the form of hot air, but no steam in converting the dry material into a mash suitable for pelleting." This is done for purposes of "separating the temperature input from moisture input such that they may be individually adjusted independently of each other," thereby purportedly addressing the problems of using steam in which "an increase in the amount of steam increases both moisture and temperature and vice versa."

U.S. Pat. No. 4,935,874 (incorporated herein by reference) describes a system to control a vapor steam generator by sensing exhaust temperature of the steam. U.S. Pat. No. 4,935,874 proposes controlling mash temperature and moisture at the pellet mill using a plurality of temperature sensors. It does not account for variances in temperature or moisture content of the incoming "dry" material and the effect these have on the moisture at the pellet mill. Further, it describes a vapor steam generator similar to that shown in U.S. Pat. No. 4,211,071 (incorporated herein by reference) operating "at a constant pressure of between 4-6 psi" and proposes a "control mode for the vapor steam generator which permits it to generate a continuous flow of steam at a preselected moisture content, and yet provide temperature control of the steam produced". This "mode of control comprises modulating the flow of the air/gas mixture to the burner while maintaining a relatively constant water flow". An air/gas mixture is electronically controlled to deliver the appropriate flow of the air/gas mixture to the combustion chamber. Water input is independently controlled and introduced into the combustion chamber where a burner burns the air/gas mixture and converts the water directly into steam. A temperature sensor downstream from the combustion chamber senses the temperature of steam (i.e., the steam before it enters a stirring conditioner to warm and moisturize the mash), in order to control the flow of the air/gas mixture to maintain a constant temperature of the steam produced. The moisture content of the steam can be controlled by controlling the rate of water input into the combustion chamber. To try to produce finished pellets having a pre-determined moisture content, U.S. Pat. No. 4,935,874 describes controlling the rate of input of dry material as well as the rate of input of water into the combustion chamber. Its conditioner has dry material entering the top, being stirred as the material flows downward and as the vapor and air flow upward though the material, proportioning the amount of moisture to the rate of flow of dry material. It utilizes the operation of the burner to control the temperature of the exhaust steam while maintaining a rate of flow of moisture as desired to suit the flow of dry material into the pellet mill. The temperature of the steam and the moisture input to the combustion chamber are not independent. For any set flow or the air/gas mixture the temperature of the steam will be controlled by the water input. As the water input increases the temperature of the steam will decrease, as the water input decreases the temperature of the steam will increase. Further, for any set rate of water input, increasing the flow of the air/gas mixture will increase the temperature of the steam, while any decrease in the flow of the air/gas mixture will decrease the temperature of the steam. Independent control of temperature, moisture and flow are not provided.

As described by C. B. Theurer et al. in Invited Review: Summary of Steam-Flaking Corn or Sorghum Grain for Lactating Dairy Cows, Journal of Dairy Science Vol. 82, No. 9, 1999: The net energy for lactation of steam-flaked corn or sorghum grain is about 20% greater than the net energy for lactation for dry-rolled corn or sorghum. Steam-flaking of corn or sorghum grain with careful quality control consistently improves most lactational measurements, especially milk and milk protein yields.

Theurer et al. further describe that steam-rolling is a common processing method for barley, corn, and wheat used in dairy concentrates. Grains are usually steamed for 15 minutes or less to increase grain moisture to about 15 percent and then crushed with various sizes of rollers to produce a thick flake without a specific flake density endpoint, usually about 438 to 540 g/L for corn and sorghum (34 to 42 lb./bu., in units as used in the industry). Quality is usually based on visual appraisal rather than steaming time, moisture content, flake density, or laboratory indices. Dry-rolling is a common form of processing barley, sorghum, and wheat; dry grain is passed through large rollers (46 to 76 cm or larger) to break the grain into several pieces (similar to coarsely ground), with a bulk density for sorghum of about 450 to 644 g/L (35 to 50 lb/bu).

Theurer et al. still further describe that steam flaking is a more extensive processing system (with careful quality control) than dry- or steam-rolling. In some embodiments, whole grain is steamed for 30 to 60 minutes in a vertical, stainless steel steam chamber (usually 3.1 to 9.2 m height and 91 to 183 cm diameter) to increase grain moisture to 18 to 20% and then flaked between preheated large rollers (e.g., 46 cm diameter by 76 to 91 cm length or 61 cm diameter by 122 cm length) to a specific desired flake density (usually 309 to 386 g/L or 24 to 30 lb/bu) (53). In most cited studies, the grain was steam flaked to a flake density (FD) of about 360 g/L and is referred to as SF 28 (reflecting the flake density in pounds per bushel after steam flaking). The rollers become hot as the steamed grain passes through, which is important in the flaking process. The extent of processing (flaking pressure) increases as flake density decreases (i.e., 309 g/L flake is more extensively processed than a 386 g/L flake). The quality of steam-flaked grain is routinely measured by flake density, and by laboratory methods (enzymatic starch hydrolysis or percent starch gelatinization).

U.S. Pat. No. 6,330,982 (incorporated herein by reference) describes a grinding system that allows for processing of both coarse and fine particles.

U.S. Pat. No. 5,486,102 (incorporated herein by reference) describes a pellet mill.

U.S. Pat. No. 4,674,418, (incorporated herein by reference) describes a cyclone cleaner.

What is needed is a system and method for processing an agricultural-product with improved heat and moisture recovery and control.

SUMMARY OF THE INVENTION

In contrast to systems that heat mash with dry air, expending considerable amounts of heat, drying the mash and requiring high production costs, and to systems that heat mash with uncontrolled steam and/or inefficiently recovered heat and moisture, the present invention heats and moisturizes air that is used to pre-heat and premoisturize agricultural starting material (mash) in a controlled manner to obtain consistent predictable product output taking into account the starting temperature and/or moisture content of the starting material, and in a variety of environmental conditions. Conventional systems that add heat only (i.e., as contrasted to steam or moist warm (or hot) air) are inefficient, since heat without moisture dries the product, using additional energy (i.e., the heat of vaporization for the moisture removed) and requiring additional liquid water be added. In some embodiments, the method extracts heat and moisture (in a highly efficient cooler or dryer) from cooling and/or drying agricultural product to a flow of air, and uses this warmed, moist air to preheat and premoisturize the mash. In doing so, some embodiments inject about two points of moisture (i.e., 2 pounds of water per 100 pounds of product, which equals 2 grams of water per 100 grams of product) and 970 BTUs of heat per pound (540 calories/gram) of water are transferred into the mash, reducing the amount of steam that is required later in the steam-conditioning part of the process. This reduces operating costs by the amount of steam and energy that would have otherwise been necessary.

In some embodiments, the system includes one or more counter-flow devices or other direct-contact heat-transfer devices, also called a heat exchanger, evaporator or condenser (in some embodiments, these also provide a water evaporation (in the case where cool air is used to dry agricultural material later in the overall process) or water condensation (in the case where warm, moist air is used to pre-moisturize and heat incoming agricultural material earlier in the overall process function, wherein the latent heat of evaporation of water is used to enhance heat transfer), located at an early pre-heat portion of the system and a later cooling portion of the system. In a counter-flow device, incoming air and incoming product are input at opposite ends of the device and flow through one another in direct contact and in opposite directions, providing a greater amount of heat and moisture transfer within the device. This increased efficiency reduces operating costs by allowing for a greater degree of heat and moisture transfer between the agricultural product and the air in the cooling portion, and this heat and moisture are then more efficiently transferred to the mash in the pre-heat portion.

Some embodiments of the invention provide a method that includes pre-conditioning an agricultural material by direct contact with a mixture of heated air and moisture to form preconditioned agricultural material that is warmed and moisturized and a first exhaust stream that is cooler and drier than the mixture of heated air and moisture, measuring a plurality of temperatures of air flows and material, and controlling the mixture of warm air and moisture in order to control a temperature and a moisture content of the preconditioned material based on the measured temperatures, steam conditioning the agricultural material, processing the steam-conditioned material into warm processed product, and cooling the warm processed product with air to produce cooled processed product and warm moist air of a second exhaust stream.

Some embodiments of the invention include an apparatus that includes a mixing unit that adds controlled amounts of heat and moisture to an incoming air stream to generate a heated moisturized air stream, a moisture-and-heat-transfer unit that provides direct contact transfer between an incoming agricultural product mash and the warmed or hot moisturized air stream, and that outputs warm mash and a first exhaust stream, an agricultural-product processor operatively coupled to receive warm mash and that outputs a warm, moist processed product, an agricultural-product dryer/cooler operatively coupled to receive the warm, moist product and that outputs cooled product, and a controller operatively coupled to receive temperature and moisture parameters from a plurality of locations in the apparatus and, based on the parameters, coupled to the mixing unit to control the amounts of heat and moisture added to the incoming air stream.

In some embodiments, the agricultural-product processor is an ethanol-processor and the agricultural-product dryer/cooler is an ethanol-byproduct dryer/cooler. In other embodiments, the agricultural-product processor is a wet-corn starch processor and the agricultural-product dryer/cooler is a dryer/cooler of an output product or byproduct of wet corn processing. In still other embodiments, the agricultural-product processor includes a pelletizer and the processed product includes warm pellets. In some embodiments, the pellets form animal feed. In other embodiments, the pellets form a fuel for wood-burning heaters.

One aspect of the invention, in some embodiments, provides a method that includes transferring heat and moisture from a warm, moist exhaust stream to incoming agricultural material, steam conditioning the material, pelletizing the material into warm pellets, cooling and/or drying the warm pellets with make-up air to produce the warm, moist exhaust air used in the transferring of heat to the incoming material and to produce cooled pellets, wherein the cooled pellets are at a temperature lower than the warm, moist air. In other embodiments, this general method is used in the production of starch, ethanol, sugar, syrup, or other agricultural products.

Another aspect of the invention, in some embodiments, provides an apparatus that includes a steam conditioner that adds heat and moisture to an incoming mash, a pellet mill coupled to receive the heated, moisturized mash and generate hot, moisturized pellets, and means for recovering heat and moisture from pellets and transferring the heat and moisture to an incoming material stream.

Still another aspect of this invention, in some embodiments, provides an apparatus that includes a heat-recovery system that provides direct contact between an incoming agricultural product mash and a warm, moist exhaust, a steam conditioner operatively coupled to receive warm mash from the heat-recovery system and that injects steam, an agricultural-product processor operatively coupled to receive steam-injected warm mash and that outputs warm, moist processed product, an agricultural-product dryer/cooler operatively coupled to receive warm, moist processed product and that outputs cooled processed product at a temperature lower than the warm moist exhaust, and a controller operatively coupled to dynamically adjust an amount of heat or moisture transferred based on an ambient-air temperature.

Still another aspect of this invention, in some embodiments, provides an apparatus that includes a heat-recovery system that provides direct contact between an incoming agricultural product and a warm, moist exhaust, a product conditioner operatively coupled to receive warm product from the heat-recovery system and that injects steam or hot water, an agricultural-product processing system operatively coupled to receive warm wet agricultural product and that outputs warm, moist processed product, an agricultural-product dryer/cooler operatively coupled to receive warm, moist processed product and that outputs dry processed product at a temperature lower than the warm moist exhaust, and a controller operatively coupled to dynamically adjust an amount of heat or moisture transferred based on an ambient-air temperature.

The apparatus and method described herein may be used in agricultural-product processing, ethanol production, wet corn milling, and sugar refining. By using this invention for any of these purposes, operating costs will be reduced, output quality may be improved, and greater control of the system and the component devices may be achieved.

BRIEF DESCRIPTION OF THE DRAWINGS

FIG. 2 is a side-view cross-sectional diagram of a counter-flow pellet dryer/cooler 200.

DESCRIPTION OF PREFERRED EMBODIMENTS

Figure 1:
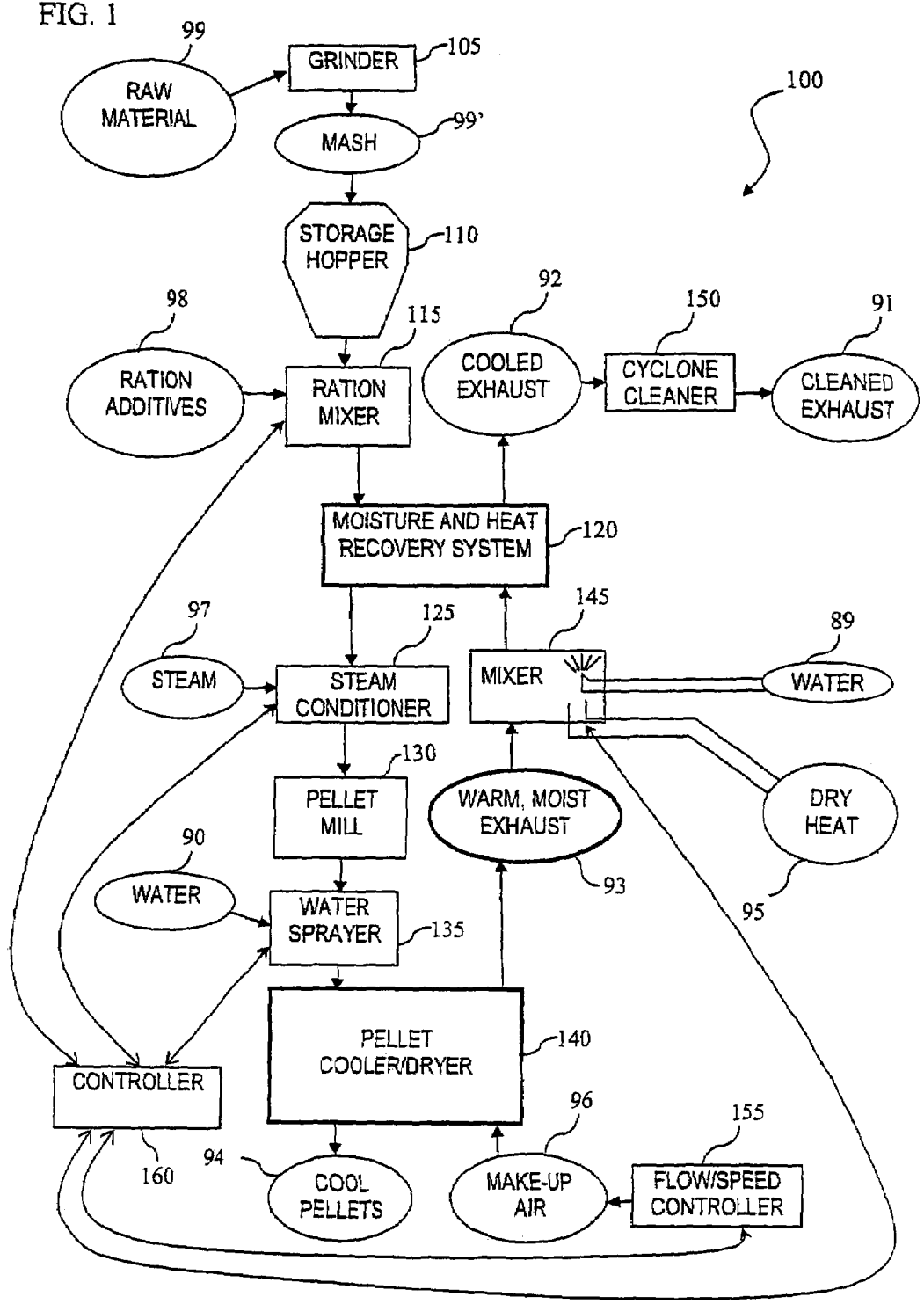
FIG. 1 is a block diagram of a system 100 of some embodiments of the invention that provides agricultural-product production with heat and moisture recovery and control.

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally correspond to the Figure number in which that component is first introduced, such that the same reference number is used throughout to refer to an identical component which appears in multiple Figures. Signals (such as, for example, fluid pressures, fluid flows, or electrical signals that represent such pressures or flows), pipes, tubing or conduits that carry the fluids, wires or other conductors that carry the electrical signals, and connections may be referred to by the same reference number or label, and the actual meaning will be clear from its use in the context of the description.

System Environment

The present invention provides improved heat and moisture recovery (i.e., extracting heat and moisture from product being cooled and dried later in the process, and transferring that heat and moisture to incoming material earlier in the process). In many of these environments, the warm moist air from the dryer/cooler also contains oil, food or dirt particulates, and other contaminants from the cooling product, which would quickly foul a conventional heat-transfer device. Accordingly, in some embodiments, the warm moist air is forced through the incoming material in direct contact (with measures to prevent "channeling") to achieve better efficiency and reduce fouling. Because the incoming material is constantly being replenished and is absorbing much of the oil, particulates, and other contaminants along with a substantial amount of heat and moisture, the exhaust air is cooler, cleaner, and/or less polluted than the exhaust air from conventional systems.

In some embodiments, the present invention also provides adjustments and controls that better address process differences, e.g., between summer and winter ambient air conditions and other variables. In some embodiments, one or more variables are measured, such as ambient air temperature and/or humidity, raw material temperature and/or moisture content, air and product flow rates, final product temperature, color, and/or moisture content. Based on those measurements and on formulas, tables, or other conversion methods, control signals are generated to adjust various process parameters, such as the amounts of water, steam, and/or heated dry air to add, flow rates, and the like. In some embodiments, such process control, optionally including closed-loop feedback, provides a higher-quality and higher-weight final product at higher throughput and lower energy costs.

In some embodiments, little or no heat recovery is utilized (this is also the situation when such a process that normally uses heat recovery is just starting up and no warm moist air from cooling the end product is yet available). In some such embodiments, the control systems described herein are used to control the amount of dry heat and moisture that are added together and then mixed with the incoming grain in order to obtain a carefully controlled process and high-quality output product. In contrast to certain conventional systems that separately add dry heat (which dries the mash, thus wasting the energy used to vaporize the water dried from the mash) and liquid water to obtain their preheated mash, these embodiments of the present invention mix controlled amounts of dry heat and liquid water or steam together prior to contacting the mash, in order to obtain the desired temperature and moisture content of the mash without the inefficiency of drying the mash prior to adding the liquid water.

FIG. 1 is a block diagram of a system 100 that provides for agricultural-product production with heat and moisture recovery and control. In some embodiments, system 100 includes grinder 105, such as a hammer mill, that takes raw material 99, such as corn or other grains, and grinds the raw material 99 to some consistency suitable for use by system 100. In some embodiments, grinder 105 may be of the type described in U.S. Pat. No. 6,330,982, allowing for processing of both coarse and fine particles.

In some embodiments, an optional storage hopper 110 is included in system 100. Storage hopper 110 provides a buffer to maintain a constant flow of material from the grinder through the agricultural-product-processing system. Output from the hopper remains constant, even as input to the hopper may vary. Also, the rate of material flow through grinder 105 may vary. Hopper 110 provides a means of adjusting for these variables and maintaining a constant flow of material into ration mixer 115 and through system 100. This will prevent the grinding system from overloading while maintaining the highest possible flow rate through system 100.

In some embodiments, ration mixer 115 takes raw milled material 99' from storage hopper 110 and adds one or more ration additives 98, mixing the material 99' and additives 98 together to form a material sometimes known as mash, milled product, processed product, mixed ration or feedstuff. Ration additives may include various combinations of other grains (to improve nutrient value of the resulting agricultural product), protein-rich concentrates, carbohydrate-enrichments, fat-rich additives, *Lactobacillus acidophilis* and *Lactobacillus bulgarium* ("to provide a non-hygroscopic free-flowing, self-preserving animal feed supplement"), lactic acid (for foodstuff preservation), mineral substances, antibiotics, enzymes, hormones, trace elements, vitamins, pharmaceuticals, and/or preservatives.

Moisture-and-heat-recovery system 120 takes hot, moist air 93 recovered from pellet dryer/cooler 140 later in system 100 and forces the hot, moist air 93 through the material 99' flowing in from ration mixer 115 (or, in other embodiments, from grinder 105 or hopper 110) in order to pre-moisturize and preheat the material 99'. In some embodiments, moisture-and-heat-recovery system 120 preheats and pre-moisturizes the mash material 99' by efficient direct-contact heat transfer before material 99' flows into steam conditioner 125. Moist exhaust air 93 from later in system 100 enters moisture-and-heat-recovery system 120 and moisture and heat is extracted and applied to the mash material 99'. By reusing moisture and heat from warm, moist exhaust 93, system 100 provides a more cost-efficient method for making agricultural products. In some embodiments, hot, moist exhaust air 93 contains high oil and particulate content that will foul a typical heat-recovery device, and which usually needs to be removed from the exhaust stream before it is released to the outside to avoid polluting the environment. By forcing the hot, moist exhaust air 93 having high oil and particulate content through the incoming agricultural product, the exhaust stream is both cooled and cleaned of at least some of the oil and particulate content, reducing pollution, and reducing the natural resources that are otherwise needed to heat the incoming agricultural product for processing.

When pelleted mash is dried out in the pellet dryer, sensible heat, latent heat and moisture are released by the pelleted mash to the drying air. At dryer/cooler 140, the latent heat of vaporization (970 BTUs of heat per pound of water=540 calories/gram of water) is extracted from the output product stream by evaporation of the water removed. This air becomes the warm, moist, exhaust air from the exhaust stream and contains water vapor, which, when transferred to a liquid state in the moisture-and-heat-recovery system, contributes heat into the mash. At heat-recovery system 120, the latent heat of vaporization (970 BTUs of heat per pound=540 calories/gram of water) is transferred into the incoming product stream by condensation of the water absorbed. Thus, the amount of latent heat injected into the mash is roughly about 1000 British Thermal Units (BTUs) per pound of condensed water (one BTU is the amount of heat needed to raise one pound of water one degree Fahrenheit). The specific heat for a mash is on the order of 0.5 BTU/lb/degree F. (raising the temperature of mash by one degree Fahrenheit requires roughly one-half BTU per pound of mash) (about 0.5 calories/gram/degree Celsius). When mash is heated by warm air, with sufficient moisture, heat will be transferred to the mash from reducing the temperature of the warm, moist air (sensible heat) and the condensation of moisture from the warm, moist air (latent heat). By taking an amount of moisture out of the moist exhaust stream and adding it to the mash, latent heat of the moisture is transferred. The amount of sensible and latent heat which is transferred reduces the amount of heat which must otherwise be added with steam by the steam conditioner later in the process. By replacing some of the heat and moisture transfer through the moisture-and-heat-recovery system 120, less addition of heat and moisture through steam injection is required, thereby reducing the costs (both in the expense of energy and the capital costs of the machinery) of producing that steam. Far less energy is required to heat the mash using air with sufficient moisture than if dry, hot air is used, since using dry hot air will result in moisture in the mash evaporating, using about 1000 BTUs per pound (540 calories/gram) to dry water out of the mash. Each time water changes physical state, energy is involved. "Sensible heat" is heat that can be measured by a dry-bulb thermometer, using, e.g., Celsius or Fahrenheit scales of measurement. "Latent heat" is the energy required (absorbed) to change a substance to a different state of matter, e.g., from liquid to a gas state. This same energy is released from the substance when the change of state is reversed, e.g., when moisture condenses. In particular, preheating the raw product at this point using dry heat only or separately from moisture or steam requires more energy since the heating both heats the mash and causes water in the product to go to a gas phase or state (i.e., the latent heat of vaporization for that water). In contrast, passing warm moist air through the cool incoming product causes the moisture in the air to condense onto the product, transferring that latent heat to the product and cooling and cleaning the air. To avoid having to provide the extra energy for latent heat to dry the product, warm moist air is used having sufficient moisture to avoid drying the product. This warm moist air for system 120 comes from either the exhaust air of a cooling/drying operation (in which case, system 120 is a heat-recovery system) or from adding liquid water or steam to heated air (in which case system 120 is a preheating and premoisturizing system).

In some embodiments, heat-recovery system 120 includes a counter-flow bin similar in structure to pellet dryer/cooler 140, as afterward described. In some embodiments, a Bliss Op-Flow Counter-Flow device, or a similar unit, is used for heat-recovery system 120 and/or pellet dryer/cooler 140. In other embodiments, heat-recovery system 120 is a flash dryer/cooler, or modified flash dryer/cooler. In still other embodiments, heat-recovery system 120 is a fluid-bed dryer/cooler, a ring dryer/cooler, rotary-drum dryer/cooler or any other mechanical device providing contacting of dry powders, cakes, mixes, or other some such material with a gas stream to effect heat and/or mass transfer. In some embodiments, the heat-recovery device is a single co-flow device in which the mixed ration and warm, moist exhaust both move in the same direction. In other embodiments, heat-recovery device 120 is a single counter-flow device, in which the mixed ration and warm, moist exhaust move in opposite directions. In still other embodiments, a plurality of co-current flow and/or counter-current flow devices are used in the heat-recovery device.

Counter-flow heat-recovery devices differ from co-flow heat-recovery devices in that the flow of make-up air is in a direction opposite to the flow of the cooling agricultural product, while in a co-flow device these flows are in a concurrent direction. In a co-flow device the output product and output air have temperatures that, at best, approach a median temperature of the incoming thermal masses. The same is true of cross-flow devices such as described in U.S. Pat. No. 4,659,299, wherein the airflow is moving vertically upward through product moving horizontally on a belt. The advantage to utilizing a counter-flow device is that the opposite flow directions allow for a higher amount of heat transfer between the air and product. The air exhaust from the device approaches a temperature quite close to the temperature of the incoming solid/liquid product, and the output product approaches a temperature quite close to the temperature of the incoming air. This increased transfer of heat allows the preheated agricultural product from heat-recovery device 120 to attain a temperature higher than that of its exhaust air 92 and cooled agricultural product from dryer/cooler 140 to attain a temperature less than the temperature of hot, moist air exhaust 93, a feat which is unachievable in a co-flow or cross-flow device.

In some embodiments, steam conditioner 125 is a device that conveys materials coming out of moisture-and-heat-recovery system 120 and injects high-pressure steam into the material. The amount of steam injected by steam conditioner 125 is adjusted based upon temperature and moisture content of raw material 99. In summer months, when raw product having a temperature of, e.g., 90 degrees Fahrenheit (32 degrees C.) is input into system 100, 2 to 3 points of steam is injected (if the desired temperature is achieved with less steam, more hot water may have to be added to obtain the desired moisture content). The amount of heat required increases as the raw product's initial temperature drops, possibly requiring, e.g., 4 to 5 points of steam to achieve the desired temperature (e.g., 200 degrees F.=93 degrees C.) when raw product having average temperatures of, e.g., 30 to 50 degrees Fahrenheit (about −1 degrees C. to 11 degrees C.) are input during the winter months. Additional steam injection occurs in winter months due to the colder temperature of input material and ambient air, requiring more steam conditioning to create good gelatinization. However, if too much moisture is added before the mash enters the pellet mill, "pellet-roll slip" may occur which can affect pellet mill performance. The amount of steam which must be injected by steam conditioner 125 into the material is reduced due to the mash preheat and pre-moisturizing done in moisture-and-heat-recovery system 120, thereby reducing operating costs. In some embodiments, material coming out of steam conditioner 125 contains, e.g., a moisture content of 17 or 18% and a temperature of 200 degrees Fahrenheit (93 degrees Celsius).

In some embodiments, pellet mill 130 is a Bliss Pioneer Pellet Mill. In other embodiments, pellet mill 130 includes a device as described in U.S. Pat. No. 5,486,102, or other suitable device. In some embodiments, product coming out of steam conditioner 125 is dropped into a pellet mill that has a die face around it. Three wheels or rollers push and squeeze the mash of materials into the die face. The die face includes holes through which the mash can exit the pellet mill and a scraper mechanism is used cut the product. The agricultural product output from the pellet mill consists of formed and shaped pellets having temperatures of, e.g., 200 degrees Fahrenheit (93 degrees Celsius). The pressure needed to force the agricultural product through the holes in the die face serves to increase the density of the pellets. In some embodiments, pellets leaving pellet mill 130 are input into a pellet dryer/cooler and dryer 140 after passing through a water sprayer 135.

In some embodiments, water sprayer 135 is provided that adds additional moisture, e.g., one pound of water for every 100 pounds of pellets depending on conditions, to the outer surface of the pellets before the pellets are removed from pellet dryer/cooler 140. When ambient air temperatures are higher, e.g., in summer months, pellet dryer/cooler and dryer 140 transfers roughly 3% of moisture from the pellets to incoming make-up air 96, a transfer rate which may be roughly three times the transfer rate observed in winter months. Without this additional 1% of water sprayed onto the pellets by water sprayer 135, this moisture transfer would result in cool pellets having a moisture composition of, e.g., only 14 pounds of water and 86 pounds of processed pellet material. This over-dry composition makes for fragile pellets with a less-than-ideal pellet durability index (PDI). The 1% of water added to the pellets will be part of the 3% of moisture transferred in the pellet dryer/cooler, resulting in pellets having a composition of, e.g., 15 pounds of water and 86 pounds of processed pellet material, providing a better PDI and about one percent more final product by weight.

Alternative methods of remedying the problems caused by warm-weather operations and to control (decrease) the exhaust temperature are also available. In some embodiments, the total pounds of dry air coming in contact with the product (which can be measured as SCFM=Standard Cubic Feet Per Minute, or standard cubic meter/minute=35.3 SCFM) through the system is varied. By increasing the airflow, there will be a proportionally lower increase in the air temperature across pellet dryer/cooler 140, while decreasing the maximum humidity ratio below saturation point exponentially. However, there is a practical limit to how much airflow change may be accomplished and how much this alteration will affect pellet production. In other embodiments, additional water is added to the system from an external source other than the pelleting system. This allows control of the water-mass balance independent of the pelleting operation. This would increase the amount of evaporative cooling in the unit. In addition, by increasing the surface moisture on the pellets it "protects" the internal pellet moisture from evaporation, improving pellet durability and final product moisture. In some other embodiments, the amount of moisture in the pellets is increased. This increases the amount of evaporative cooling in the unit and results in reduced delta T on the air stream. There is a limitation in this application due to the maximum amount of moisture which can be added to the mash without causing slip. In still other embodiments, an external cool air source is added to the dryer/cooler.

Based on the alternative alterations, the most economical implementation is adding additional water to the system from an external source. In some embodiments, implementation of this water spraying process involves monitoring the temperature of the exhaust air from the pellet dryer/cooler and modifying a water spray system to apply moisture to the pellets using a proportional integral derivative (PID) control loop. In some embodiments, the water spray system applies moisture to the pellets between the pellet mill 130 and the dryer/cooler 140. The water addition equipment is available, since the current system is often adding water at the conditioner. Tests of this process, in some embodiments, have increased the moisture in cool output pellets by 0.5% (from 11.5% to 12%) in warm ambient air temperature conditions by decreasing the exhaust temperature from about 166 degrees Fahrenheit (74 degrees Celsius) to 159 degrees Fahrenheit (70 degrees Celsius). Additionally, pellet durability (as measured by pellet durability index (PDI)) can be increased by 2.3 PDI units by water spray.

In some embodiments, pellet dryer/cooler and dryer 140, such as the Bliss Op-Flow Cooler, is used to cool the pellets to a temperature suitable for storage and within, e.g., six degrees Celsius of ambient air temperature. In some such embodiments, pellet dryer/cooler and dryer 140 is a counter-flow device, i.e., pellets moving through dryer/cooler 140 travel in an opposite direction from make-up air 96. Pellets having temperatures of, e.g. 200 degrees Fahrenheit (93 degrees Celsius), enter pellet dryer/cooler 140 through a disperser 202 at the top of the cooler and are evenly distributed in the unit to ensure uniform cooling. Make-up air 96 having a temperature of, e.g., 90 degrees Fahrenheit (32 degrees C.) and 60 degrees (16 degrees C.) wet bulb in summer and 40 degrees Fahrenheit (4 degrees C.) and 30 degrees (−1 degrees C.) wet bulb in winter is injected into the base of pellet dryer/cooler 140. Make-up air 96 is gradually warmed and moisturized by pellets in dryer/cooler 140. For example, at some point inside dryer/cooler 140, near the place of input of make-up air, air in the winter will have temperatures of, e.g., 40 degrees Fahrenheit (4 degrees Celsius), and pellets will have temperatures of, e.g., a few degrees warmer than 40 degrees Fahrenheit (4 degrees Celsius). In some such embodiments, near the point of pellet entry in dryer/cooler 140, pellets will have temperatures of, e.g., 200 degrees Fahrenheit (93 degrees Celsius) and air will have temperatures of, e.g., a few degrees below 200 degrees Fahrenheit (93 degrees Celsius). Temperature and moisture will transfer between the pellets and air at these points, and all other points in the dryer/cooler 140, cooling the pellets and warming and moisturizing the air. In embodiments in which the pellet dryer/cooler 140 is a counter-flow device, more heat and moisture are transferred between the pellets and make-up air, allowing the cooled pellets output by dryer/cooler 140 to reach a temperature less close to the temperature of the incoming make-up air 96.

In some embodiments, goals of pellet dryer/cooler 140 include providing predictable pellet durability by consistently drying the pellet, controlling shrink/gain of moisture from the pelleting process, bringing the pellets close to ambient temperature to control moisture in storage bins, and drying the pellets sufficiently to control moisture in the stored product.

Variables which affect pellet drying include the total amount of moisture moving in the pellets and mixture of surface moisture versus encapsulated particle moisture, the total pounds of dry air coming in contact with the product (SCFM), the design of the dryer/cooler to provide good contact between air and the product for a sufficient amount of time, and the humidity ratio of the air. The contact between air and product is assumed to be optimized with current counterflow dryer/cooler designs. With a conventional system, airflow is mostly a function of air density at the fan and dryer/cooler pressure drop pursuant to the fan laws. More SCFM will move through the system as air temperature is cooled. Conventionally, there is no automated control damper on the fan, leaving processing at the mercy of the system and performance characteristics of the fan.

Currently, operators only independently control the feed flow rate of the system and the retention time. Some variables are constant or driven by other processes. These variables include conditioned mass temperature (equal to 190 degrees Fahrenheit (88 degrees Celsius)), maximum mash moisture content (determined by optimization of the pellet mill and mash temperature), and exhaust temperature maximum humidity ratio (equal to some function of the warm, moist exhaust temperature). Other variables are environmental and include mash temperature, cooler inlet temperature, and cooler inlet wet bulb (which is not very important). Derived results from this system include cooler airflow (as a function of air density and cooler retention time), pellet outlet temperature, pellet outlet moisture, and warm, moist exhaust temperature.

To control the process, a selected variable, usually the temperature of the warmed, moisturized air at the warm, moist exhaust, is kept constant. The temperature of the warmed, moisturized air at the warm, moist exhaust is usually chosen as the constant because it has the biggest effect on how much water can be carried out of the system and thus the water-mass balance.

The temperature of outlet, exhaust air from dryer/cooler 140 varies directly with the inlet temperature of make-up air 96, because there is a constant delta-T (change in temperature) in the air stream if airflow rate and flow rate of pellets are constant, with the energy in the pellets creating the only heat source for the dryer/cooler. Also, the humidity ratio (in pounds of water per pound of dry air), representing the amount of water the air is capable of removing from the system, and the differential partial pressure which drives mass transfer rates, vary relative to temperature following psychrometric principals (the measurements and relationships of moist air, such as dry-bulb temperature, wet-bulb temperature, dew-point temperature relative humidity, humidity ratio (kg water/kg dry air), enthalpy, and density). That is, as the temperature of input make-up air increases, the output air-saturation point humidity ratio increases exponentially. Relative humidity of the incoming air is inconsequential because of the exponential relationship of maximum humidity ratio versus temperature. Therefore, in winter months, when the ambient air temperature is lower, the saturated humidity ratio is lower, reducing the amount of water which may be removed from the system. This is reversed in summer months, with a higher potential of water removal from the air because the incoming air temperature is higher. Furthermore, in winter months, exhaust temperature of the dryer/cooler 140 is low, e.g., around 140 degrees Fahrenheit (60 degrees Celsius) and the air stream becomes saturated without fully drying the pellets. Adjustments to system 100 including a water-spraying apparatus 135 and airflow controller 155 are introduced to account for the changes in moisture-transfer rates due to temperature changes.

Different alternations may be made to the system in order to control (increase) the exhaust temperature to remedy the problems incurred in winter months. In some embodiments, the SCFM is varied through the system. By reducing the airflow, there will be an increase in air temperature across the dryer/cooler proportionately, while allowing the humidity ratio to increase exponentially following psychrometric principals. In other embodiments, an external heat source may be added to the dryer/cooler and two zones (a drying zone and a cooling zone) may be created in the unit. Simply pre-heating the air for the dryer/cooler inlet will not work, since the system will be temperature limited on the pellet outlet temperature, but operators still want to get the pellets close to the ambient air temperature. In still other embodiments, the amount of moisture in the pellets may be decreased. This would reduce the amount of evaporative cooling in the unit and result in additional delta T on the air stream. This process may only be accomplished by controlling the mash temperature without adding steam and would require an external energy source and an additional process.

Out of the alternative alternations, varying the SCFM through the system is the most economical implementation. Therefore, in some embodiments, speed of make-up air 96 is adjusted by flow/speed controller 155. Flow controller 155 adjusts the speed of air flowing into pellet dryer/cooler 140 to compensate for, e.g., changes in ambient air temperature. Hot make-up air entering dryer/cooler 140 is capable of holding a higher amount of moisture than cold make-up air. Therefore, in winter months, when air temperatures are considerably lower than in summer months, less moisture would be transferred from the pellets to the air. Pellets are then output having, e.g., 16% water content, which is unsuitable for pellet storage and causes moldy pellets. To remedy this, flow controller 155 reduces the speed of make-up air flow in winter months. This allows the air to heat up more in the pellet dryer/cooler 140, allowing more moisture to transfer from the pellets to the make-up air, reducing the moisture content of cool pellets 94 and giving them a more desirable PDI. Flow/speed controller 155 increases the speed of air flow back to an appropriate speed as ambient air temperatures increase.

In some embodiments, implementation of this air-flow-alteration process includes monitoring the temperature of warm, moist exhaust and modifying an exhaust-fan damper position using a proportional integral derivative (PID) control loop. In some embodiments, this is accomplished with a variable frequency drive (VFD) on the exhaust fan. In testing this process in some embodiments, increasing the temperature of exhaust air from 160 degrees Fahrenheit to 165 degrees Fahrenheit by reducing the cooler air flow reduced the pellet moisture by 0.5% from 13.7% moisture to 13.2% moisture in reduced ambient temperature conditions (for example, 40 degrees Fahrenheit (4 degrees C.)).

Outputs from pellet dryer/cooler 140 are cooled pellets and heated, moist air. Cooled pellets 94 are dropped from dryer/cooler 140 and are ready to go to storage. Dry-bulb temperature of the cooled pellets may be maintained at a constant or near constant level through the adjustments made to the water sprayer and pellet dryer/cooler, which are based at least in part on measurements of ambient-air temperature. Near the top of pellet dryer/cooler 140, the heated and moisturized air which has passed through the dryer/cooler leaves the cooler as exhaust 93. This exhaust air has temperatures of, e.g., 160 degrees Fahrenheit (71 degrees Celsius) with 152 degree Fahrenheit (67 degrees Celsius) wet bulb, and a high oil and particulate content, including pollutants and waste, and causes fouling of whatever this polluted air contacts. According to the invention, the hot, moist air is fed into moisture-and-heat-recovery system 120, which removes the moisture and heat from the warm, moist exhaust 93 as well as removing some of the pollutants. This heat and moisture is transferred into mash entering system 100. In some embodiments, each pound of moisture released into incoming mash corresponds to approximately 1000 BTUs of additional heat. The recovery of heat and moisture performed by wet heat-recovery system 120 helps cut down on operating costs of system 100.

Waste products from warm, moist exhaust 93 are removed by the moisture-and-heat-recovery system and the remaining air is output as cooler, cleaner exhaust 92. Exhaust 92 is the less-hot, less-oily, and/or less-particulate-filled air, which would be undesirable and difficult to dispose of. The dry-bulb temperature of this exhaust air stream is measured and is used to control airflow volume through the heat-and-moisture-recovery system. If the heat-recovery system's exhaust stream temperature is too high in comparison with the temperature of incoming mash, the amount of airflow from the exhaust system is reduced. Conversely, if the temperature of the heat-recovery system's exhaust stream is too low in comparison to the temperature of mash, the control system will adjust the amount of airflow (e.g., increase) in cooled exhaust system 92. Cooled exhaust 92 is input into cyclone cleaner 150, which removes the majority of any remaining particulates. In some embodiments, cyclone cleaner 150 includes a device such as described in U.S. Pat. No. 4,674,418.

In some embodiments, mixer 145 injects a variable amount and/or temperature of dry heated air 95 ("dry heat") coming from, e.g., a steam coil, electric coil or gas burner, into the warm, moist exhaust 93. In some embodiments, the variable amount or temperature of the added air is based, at least in part, on a control signal from controller 160.

Controller 160 may be any suitable electrical circuit, programmable logic controller, computer, or other information-processing system (IPS). In some embodiments, controller 160 is implemented as a plurality of separate subcontrollers, each responsible for its own portion of the overall process, and each receiving one or more input signals, and generating one or more control signals. In some such embodiments, one or more of these subcontrollers monitors and/or controls operation of one or more others of subcontrollers. In other embodiments, controller 160 includes a single master computer that receives all the signals from the various sensors and generates the control signals needed for the overall process.

Particularly in winter months, the warm, moist exhaust 93, having a temperature of, e.g., 150 degrees Fahrenheit (66 degrees Celsius), together with the later-added steam, is not able to heat the mash 99' warm enough unless too much water is also transferred to the mash 99'. Exhaust air 93 having a moisture content of, e.g., humidity ratio=0.30 KG of water/KG of air, already contains enough moisture to pre-moisturize the mash, so adding more steam to the conditioner or to warm, moist exhaust air 93 would make the mash too wet and cause "pellet-roll slip." Therefore, in some embodiments, dry heat 95 is added to warm, moist exhaust 93 through mixer 145 to increase the temperature of the air entering the moisture-and-heat-recovery system to, e.g., 160, 180 or 200 degrees Fahrenheit (71, 82, or 93 degrees Celsius). Dry heat may also be added in summer months to reduce the relative moisture content of the exhaust air 93 when the air becomes too saturated. Adding heat to the cooler exhaust 93 air flow directly by a heating coil in the air flow would foul the coil with the oil and particulates from the exhaust air 93. Accordingly, in some embodiments, the additional dry heat is channeled into a mixer 145 through a smaller duct that empties into an, e.g., 20-inch duct that is carrying the bulk of the hot, moist air 93. The amount of additional heat added to the exhaust air 93 is based at least in part on measurements of the dry-bulb temperature of the air inlet and outlet of the moisture-and-heat-recovery system 120.

In some embodiments, water 89 may be added to warm, moist exhaust 93 through mixer 145. Additional water 89 may be added when temperatures of the exhaust are too high, thereby causing some of the water to be heated up and evaporated and reducing the dry-bulb temperature of the air. This process may be controlled until air temperature is at a lower and more suitable point. Water 89 may also be added in winter months to increase the amount of moisture input into the moisture-and-heat-recovery system 120. The amount of additional water 89 added to the warm, moist exhaust air 93 is based at least in part on measurements of the wet-bulb temperature of the air fed into the moisture-and-heat-recovery system. The control levels for the air infeed dry-bulb temperature, air exhaust dry-bulb temperature and air infeed wet-bulb temperature are based on the desired temperature and moisture content of the mash and also serve to control the levels of condensation and latent and sensible heat recovery in the system.

In some embodiments, controller 160 is used to adjust a variety of activities, including ration mixing, steam conditioning, water spraying, speed of make-up air, and/or mixing of dry heat within system 100 based on measurements taken both within and outside of the system 100. Measurements are taken by and reported to controller 160 pertaining to temperatures (i.e., of ambient air, pellets, and exhaust), air-humidity levels, pellet levels, flow rates, steam quality and/or amount of moisture transfer between pellets and air in dryer/cooler 140. In some embodiments, controller 160 is coupled to ration mixer 115, whereby it monitors and adjusts the amount and flow rate of ration additives mixed with the mash. In some embodiments, steam conditioner 125 is adjusted by controller 160 to provide more or less steam, depending upon temperature and moisture content of raw material 99. In some embodiments, depending upon ambient air temperature and levels of moisture conversion in dryer/cooler 140, controller 160 adjusts water sprayer 135 to provide more or less water and flow/speed controller 155 to increase or decrease flow of make-up air 96 into pellet dryer/cooler 140. For example, in summer months when ambient air temperature is high, controller 160 will cause an increase of water 91 sprayed by pellet wetter (water-sprayer) 135 on to the outer surface of the pellets where it easily evaporates to the cooling air to prevent over-drying of the pellets and will maintain the appropriate air-flow speed. As winter brings cooler ambient air temperatures, controller 160 will make adjustments to these devices which will decrease or eliminate the amount of water sprayed and will reduce the air-flow speed of make-up air 96 through flow/speed controller 155. The amount of dry heat and/or water added by mixer 145 is also controlled by controller 160 based upon moisture content and temperature of the warm, moist exhaust 93. Adjustments to the flow of overall system 100, will also be made by controller 160.

There are commercially available temperature controller systems, which can accomplish the implementation of airflow control and water flow control based on whether or not the process variable is below or above the set point. These units can control two loops in a heat/cool configuration. The addition of a fan damper VIV (variable inlet vanes) is a relatively easy retrofit. If a damper exists, a motorized actuator may need to be added to provide control. In addition, in some embodiments, the system provides instrumentation to other parts of the system in order to monitor performance of the system.

In some embodiments, various combinations of amounts of moisture transferred in heat transfer devices and the temperatures obtained and various amounts of moisture transfer from steam and heat transfer from steam are used. In some embodiments, about 0.25 point of water is transferred in heat-recovery system 120 to the incoming material 99'. In some embodiments, about 0.5 point of water is transferred. In some embodiments, about 0.75 point of water is transferred. In some embodiments, about 1.0 point of water is transferred. In some embodiments, about 1.25 points of water is transferred. In some embodiments, about 1.5 points of water is transferred. In some embodiments, about 1.75 points of water is transferred. In some embodiments, about 2.0 points of water is transferred. In some embodiments, about 2.25 points of water is transferred. In some embodiments, about 2.5 points of water is transferred. In some embodiments, about 2.75 points of water is transferred. In some embodiments, about 3.0 points of water is transferred. In some embodiments, about 3.25 points of water is transferred. In some embodiments, about 3.5 points of water is transferred. In some embodiments, about 3.75 points of water is transferred. In some embodiments, about 4.0 points of water is transferred.

In some embodiments, about 4.25 points of water is transferred. In some embodiments, about 4.5 points of water is transferred. In some embodiments, about 4.75 points of water is transferred. In some embodiments, about 5.0 points of water is transferred. In some embodiments, about 5.25 points of water is transferred. In some embodiments, about 5.5 points of water is transferred. In some embodiments, about 5.75 points of water is transferred. In some embodiments, about 6.0 points of water is transferred. In some embodiments, about 6.25 points of water is transferred. In some embodiments, about 6.5 points of water is transferred. In some embodiments, about 6.75 points of water is transferred. In some embodiments, about 7.0 points of water is transferred. In some embodiments, about 7.25 points of water is transferred. In some embodiments, about 7.5 points of water is transferred. In some embodiments, about 7.75 points of water is transferred. In some embodiments, about 8.0 points of water is transferred. In some embodiments, about 8.25 points of water is transferred. In some embodiments, about 8.5 points of water is transferred. In some embodiments, about 8.75 points of water is transferred. In some embodiments, about 9.0 points of water is transferred. In some embodiments, about 9.25 points of water is transferred. In some embodiments, about 9.5 points of water is transferred. In some embodiments, about 9.75 points of water is transferred. In some embodiments, about 10.0 points of water is transferred. In some embodiments, the amount of moisture transferred is varied and/or controlled by controller 160.

In some embodiments, the heat and water added comes from warm moist air obtained from exhaust of a cooling/drying process. In other embodiments, the heat and water added comes from warm moist air obtained from, e.g., spraying or otherwise adding liquid water (such as by using a "swamp cooler" evaporation unit with a sponge rotating between a water supply and the air) or steam into a hot-air stream heated by a coil, electric heat coil, direct fired burner or other heating device, wherein the amount of heat and the amount of water are individually controlled, e.g., by a controller that measures the wet-bulb and dry-bulb temperatures of the warm moist air stream entering the heat recovery device 120 or leaving the heat recovery device 120. Any heat transferred to the liquid water to change its state to a gas is immediately recovered when the moisture condenses onto the product in the heat recovery device 120. In some embodiments, a combination of the above mentioned exhaust and added hot air and water spray is used.

In some embodiments, various amounts of steam are used in steam conditioning that is added to the heat and/or moisture content that is used and/or transferred in the heat recovery device 120 as listed above, under the control of controller 160. In some embodiments, about 0.25 point of steam is used. In some embodiments, about 0.5 point of steam is used. In some embodiments, about 0.75 point of steam is used. In some embodiments, about 1.0 point of steam is used. In some embodiments, about 1.25 points of steam is used. In some embodiments, about 1.5 points of steam is used. In some embodiments, about 1.75 points of steam is used. In some embodiments, about 2.0 points of steam is used. In some embodiments, about 2.25 steam of water is used. In some embodiments, about 2.5 points of steam is used. In some embodiments, about 2.75 points of steam is used. In some embodiments, about 3.0 points of steam is used. In some embodiments, about 3.25 points of steam is used. In some embodiments, about 3.5 points of steam is used. In some embodiments, about 3.75 points of steam is used. In some embodiments, about 4.0 points of steam is used. In some embodiments, about 4.25 points of steam is used. In some embodiments, about 4.5 points of steam is used. In some embodiments, about 4.75 points of steam is used. In some embodiments, about 5.0 points of steam is used. In some embodiments, about 5.25 points of steam is used. In some embodiments, about 5.5 points of steam is used. In some embodiments, about 5.75 points of steam is used. In some embodiments, about 6.0 points of steam is used. In some embodiments, about 6.25 points of steam is used. In some embodiments, about 6.5 points of steam is used. In some embodiments, about 6.75 points of steam is used. In some embodiments, about 7.0 points of steam is used. In some embodiments, about 7.25 points of steam is used. In some embodiments, about 7.5 points of steam is used. In some embodiments, about 7.75 points of steam is used. In some embodiments, about 8.0 points of steam is used. In some embodiments, about 8.25 points of steam is used. In some embodiments, about 8.5 points of steam is used. In some embodiments, about 8.75 points of steam is used. In some embodiments, about 9.0 points of steam is used. In some embodiments, about 9.25 points of steam is used. In some embodiments, about 9.5 points of steam is used. In some embodiments, about 9.75 points of steam is used. In some embodiments, about 10.0 points of steam is used.

FIG. 2 is a diagram of a counter-flow pellet dryer/cooler 200. In some embodiments, pellet dryer/cooler 200 is based on a Bliss Op-Flow Cooler or similar device. Warm, moist agricultural product enters pellet dryer/cooler 200 through rotary valve feeder 201. In some embodiments, feeder 201 utilizes an airlock system, wherein air-tight compartments rotate to allow product into the dryer/cooler.

In some embodiments, discharge device 205 rotates to control the amount of product retained in the dryer/cooler at a given time. Discharge device 205 will retain more material in dryer/cooler 200 when product level in the dryer/cooler is too low, and will release more material from dryer/cooler 200 when the dryer/cooler is overloading. Measurements of product level are made by sensors placed at various positions on dryer/cooler 200.

In some embodiments, product spreader 202 is located near feeder 201 and is used to spread the agricultural product evenly and consistently over the base of the dryer/cooler. Because of spreader 202, no buildup or gaps will occur in the spread of product throughout dryer/cooler 200. It is important that the product be spread evenly and uniformly throughout the dryer/cooler to ensure that the product is cooled thoroughly, consistently, and completely. If a buildup or gap of product were to occur in dryer/cooler 200, it would change the flow of make-up air through the dryer/cooler and among the product. Air would flow through the path of least resistance, or where gaps in product occurred. This inconsistent air flow would leave some pellets warm and moist, while overly drying and cooling other pellets, resulting in a low-quality and possibly unusable product. Spreader 202 remedies this problem by creating a consistent, uniform, and even spread of product which will not provide a path of lower resistance for make-up air and will, consequently, result in a thoroughly dried and higher-quality product.

In some embodiments, selectable level sensors 204 and overload sensor 203 are provided. Level sensors 204 may be selected to reflect the optimal level of product within dryer/cooler 200. These sensors send a signal to controller 160, indicating the actual level of product within the dryer/cooler. The actual levels are compared to the desired level of product and adjustments in product flow are made. Controller 160 sends an output message to discharge device 205, adjusting the rate and amount of material outflow from dryer/cooler 200. If the product level is too low, as indicated by level sensors 204, the discharge will retain more material into dryer/cooler 200. Overload sensor 203 sends a signal to controller 160 when product levels are too high, thereby signaling discharge device 205 to reduce the amount of product retained in dryer/cooler 200. In some embodiments, controller 160 also adjusts the rate and amount of material inflow into dryer/cooler 200 based on the moisture-content of pellets within dryer/cooler 200. If the pellets are too moist, the level of product and the time spent within the dryer/cooler is increased so the pellets will have more direct contact and moisture transfer into the air. If the pellets are too dry, controller 160 will increase the flow of product out of dryer/cooler 200, decreasing the level of product and time spent and causing less direct contact between individual pellets and airflow, thereby leaving additional moisture in the output pellets.

In some embodiments, at the bottom of dryer/cooler 200 is a perforated floor through which the make-up air 96 is allowed to flow in to the dryer/cooler and the pellets are discharged. In some embodiments, this floor includes a louver discharge system for discharge device 205 and is operated by an air cylinder or electric drive. Pellets are prohibited from exiting the dryer/cooler when the bars of this discharge system 205 are in a horizontal, or closed, position as shown in FIG. 2. This floor may rotate, allowing different amounts of product to flow out of dryer/cooler 200. Air flow into dryer/cooler 200 also comes through the gaps in discharge system 205.

Upon flowing out of dryer/cooler 200 through the floor of discharge device 205, agricultural product enters cooled product discharge 206 and settles into collection hopper 207. Product discharge 206 is used to channel the product into the collection hopper 207 in a formulation which allows for proper storage of the product. After entering collection hopper 207, the product is ready for use or storage.

An air exhaust pathway 208 is located on the upper portion of dryer/cooler 200 and provides a path for the exhaust air to exit the dryer/cooler. Air which has become hot and moist through contact with the agricultural product leaves the dryer/cooler through pathway 208. This air will eventually reach the moisture-and-heat-recovery system and will be used to pre-moisturize and preheat the mash.

Figure 3A:
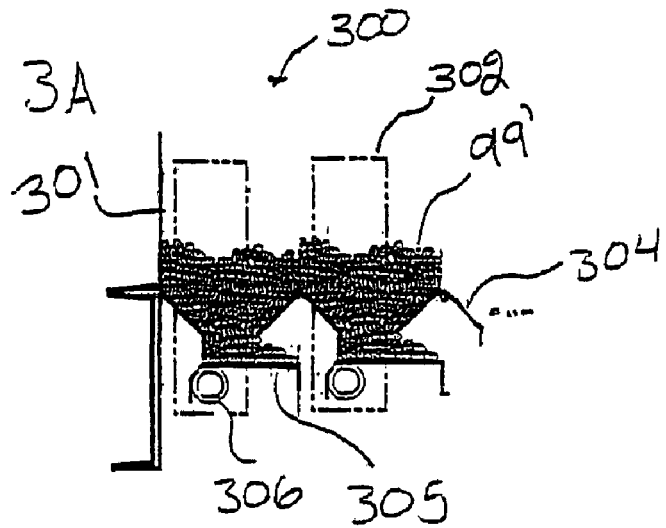
FIG. 3A is a side-view cross-sectional diagram of prior-art louver discharge system 300 in a closed position 320.

FIG. 3A is a diagram of a prior-art louver discharge system 300 (such as provided in a Bliss Op-Flo Cooler or heat transfer device) in the closed position. When lever arm 305 is in the horizontal, or closed, position, the agricultural product 99' is prohibited from leaving the dryer/cooler. Lever arm 305 is just long enough that no product may escape off the edge through the gap between arm 305 and flap 304 due to the angle of repose of the product. This causes the product to build up within the dryer/cooler, between and along dryer/cooler wall 301. The gap between arm 305 and flap 304, permits air flow up through the product and into the dryer/cooler. To allow product 99' to escape the dryer/cooler bin, axle 306 rotates, adjusting lever arm 305, e.g., rotating clockwise in FIG. 3A, and allowing material 99' to be dispelled from the dryer/cooler.

Figure 3B:
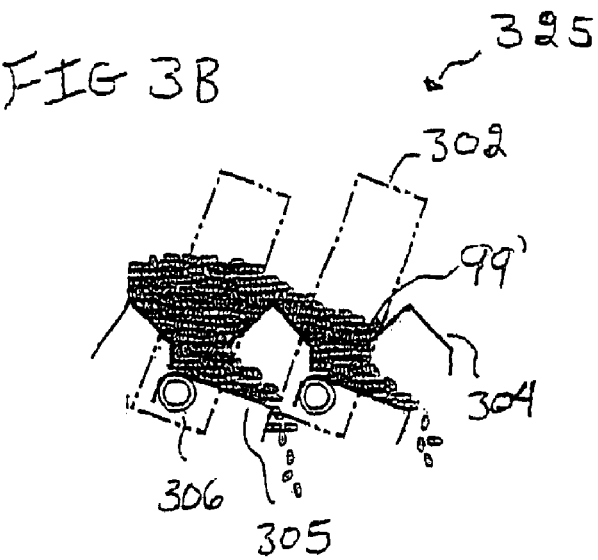
FIG. 3B shows louver discharge system 300 in a partially open position 325.

FIG. 3B is a diagram representing louver discharge system 300 in a discharge, or partially open, position 325. Axle 306 has rotated position from the axle position in FIG. 3A, thereby rotating the lever arm clockwise, and making the gap angle between lever arm 305 and flap 304 suitable for product 99' to be discharged. The positions of axle 306 and lever arm 305 are variable and may be adjusted to allow more material (greater clockwise rotation in FIG. 3B) or less material (less clockwise rotation in FIG. 3B) to be dispelled.

Figure 3C:
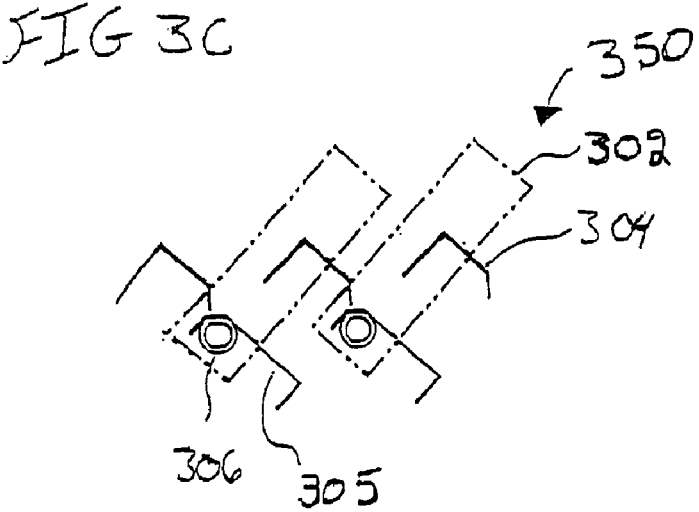
FIG. 3C shows louver discharge system 300 in a fully open position 350.

FIG. 3C is a diagram of louver discharge system 300 in a cleanout position 350. In this representation, axle 306 and lever arm 305 have been rotated to such an extent that all material 99' has been dispelled from the dryer/cooler.

Figure 4:
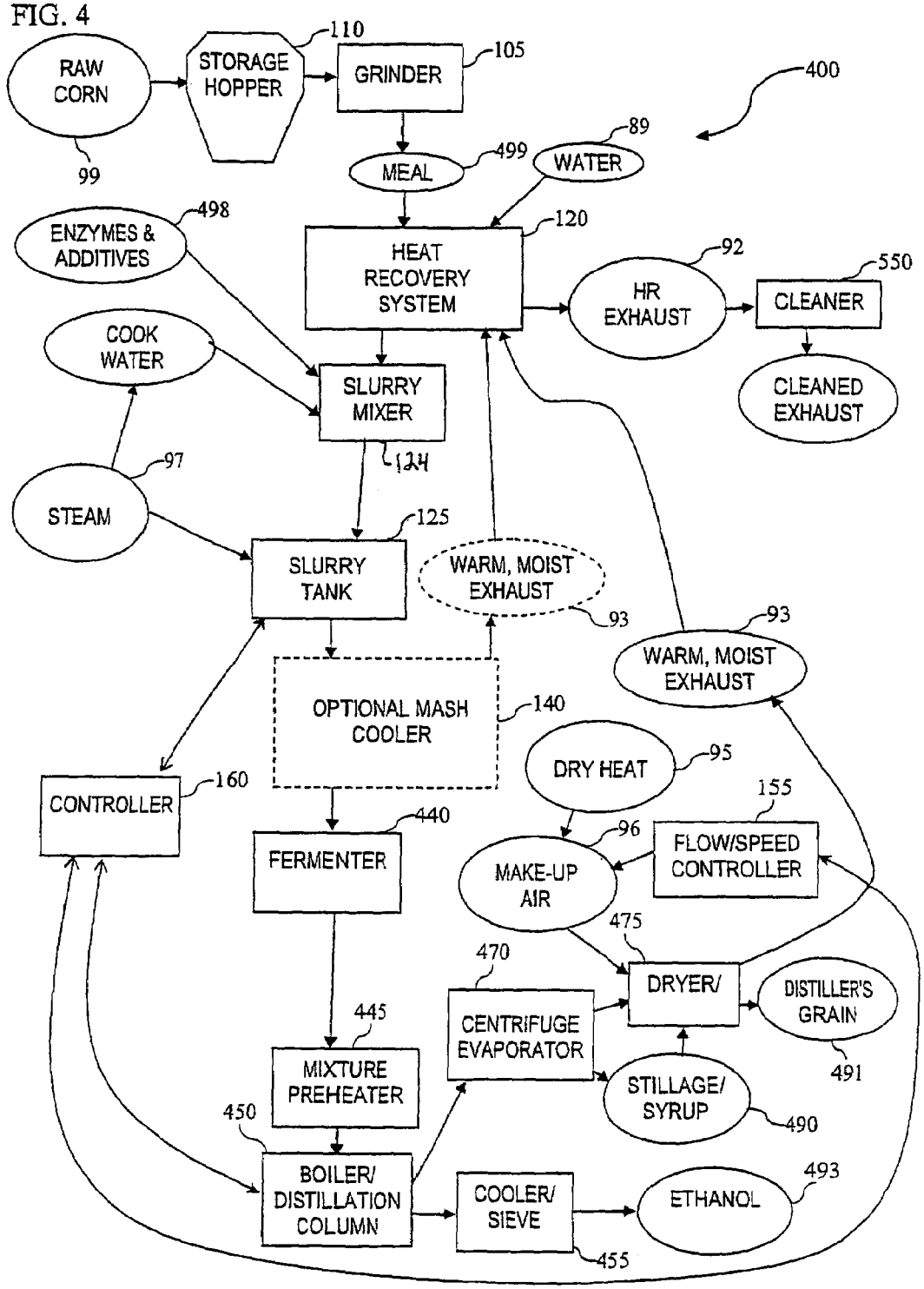
FIG. 4 is a block diagram of a system 400 of some embodiments of the invention that provides ethanol production with heat recovery and control.

FIG. 4 is a block diagram of a system 400 that provides ethanol production for some embodiments with heat recovery and control. In some embodiments, raw corn 99 is input into system 400 and enters a storage hopper 110 used to control the flow of corn into grinder 105 and the rest of system 400. Storage hopper 110 generates a constant flow of material into system 400, thereby providing a buffer against the inconsistencies in the amount of corn provided. Corn levels in storage hopper 110 vary depending upon the amount of corn provided (e.g., hopper fills up as more corn is provided than is used and levels diminish as usage exceeds the corn provided), but the output from the storage hopper remains constant.

Corn output from storage hopper 110 enters grinder 105. In some embodiments, grinder 105 includes a hammer mill. Grinder 105 grinds the corn into flour/meal 499, otherwise known as meal 499. The flour/meal 499 is a consistency suitable for use within the remaining devices of system 400.

This meal 499 is then input into a heat recovery system 120 which takes heat and moisture from other devices later in system 400, such as dryer 475 and inputs this heat and moisture to meal 499. By reusing moisture and heat from later in system 400, system 400 provides a more cost-efficient method for producing ethanol. Further, in some embodiments, makeup water 89 is added to the heat recovery system 120 to increase the mass of the incoming mash components to further utilize the energy recovered.

Meal 499 is then input into additive slurry mixer 124. In some embodiments, additives 498, including enzymes and ammonia, are added to the meal. Enzymes serve to convert the starch to dextrose, while ammonia is both a nutrient to the yeast and controls pH levels. Along with the enzymes and ammonia, cook water is also added to the meal by slurry mixer 124. The resulting product is called mash 499'.

The heated mash coming from slurry mixer system 124 enters a slurry tank 125 which adds heat and moisture to the mash (e.g., from steam 97); slurry tank 125 acting as a cooker to reduce the level of bacteria within the mash and begin breaking down the starch in the product. In some embodiments, optional mash cooler 140 receives mash from slurry tank 125 and cools it, producing warm moist exhaust 93 that is sent to heat-recovery system 120.

In some embodiments, the cooled mash output from mash cooler 140 enters a fermenter 440. It is here that yeast is added to convert sugar into ethanol and carbon dioxide. Fermenter 440 is air locked in order to prevent oxygen, unwanted and undesirable bacteria and other organisms from entering during fermentation. This airlock system also allows the carbon dioxide produced by the yeast in the fermentation process to escape.

In the fermenter 440, mash is kept at cool temperatures of, e.g., between 18 and 26 degrees Celsius to facilitate the process. If mash temperature is too high and outside a suitable range, fermentation will occur at a rapid pace and an unwanted byproduct may be produced and/or the yeast may die. Also, if mash temperature is too low and below a suitable range, fermentation will occur at a slow rate and may come to a complete stop. Therefore, it is important that the mash maintain a suitable temperature so the fermentation process is efficient. The mash is generally left in the fermenter for between 40 and 50 hours, before being further processed.

Output from fermenter 440 is a mixture of ethanol and stillage. The fermenter output is preheated by mixture preheater 445. In some embodiments, preheater 445 is a counterflow device. Preheater 445 adds energy using steam or electricity to mixture output of fermenter 440. By using a counter-flow device, the output preheater output flow 488 is able to achieve cool temperatures of nearly that of the input ethanol mixture material, while output ethanol product reaches temperatures of nearly that of the hot incoming heat transfer media.

Ethanol and stillage output from mixture preheater 445 is input into a boiler/distillation column 450, where alcohol is boiled out of the water mixture. In some embodiments, this concentrates the ethanol to, e.g. 190 proof (95% ethanol and 5% water). This ethanol is then input into a cooler/sieve 455, where the remaining water is removed (the ethanol is dried out). In some embodiments, the resulting ethanol 493 which is output from cooler/sieve 455 is, e.g., 200 proof.

Stillage output from boiler/distillation column 450 enters centrifuge 470, where it is separated into coarse grain and liquids. The liquids are evaporated to create a concentration of about 30% solids, creating syrup 490 which may then be stored or transported. Distillers' grain with solubles may also be made out of syrup 490, by drying the syrup with the coarse grain. The grain from centrifuge 470 enters a dryer 475. Dryer 475 takes cool make-up air 96, adds dry heat 95, the flow of which is controlled by flow/speed controller 155 and is adjusted based in part on temperature of material and ambient air, and uses this air to dry the warm, moist grain input from centrifuge 470. The air flow through dryer 475 removes moisture and heat from the grain input, eventually leaving dryer 475 as a warm, moist exhaust stream which is recovered by heat recovery system 120. In some embodiments, warm, moist air exhaust output from dryer 475 has a temperature of nearly that of the input grain material, whereas the output grain material achieves a temperature of nearly that of the input air stream. Dried grain output from dryer 475, known as distiller's grain 491, is then ready to be transported or stored. Warm, moist air from dryer 475 is transported through similar methods as the warm air from mash cooler 140, back to heat recovery system 120 and is injected into mash at this earlier stage of system 400.

Figure 5:
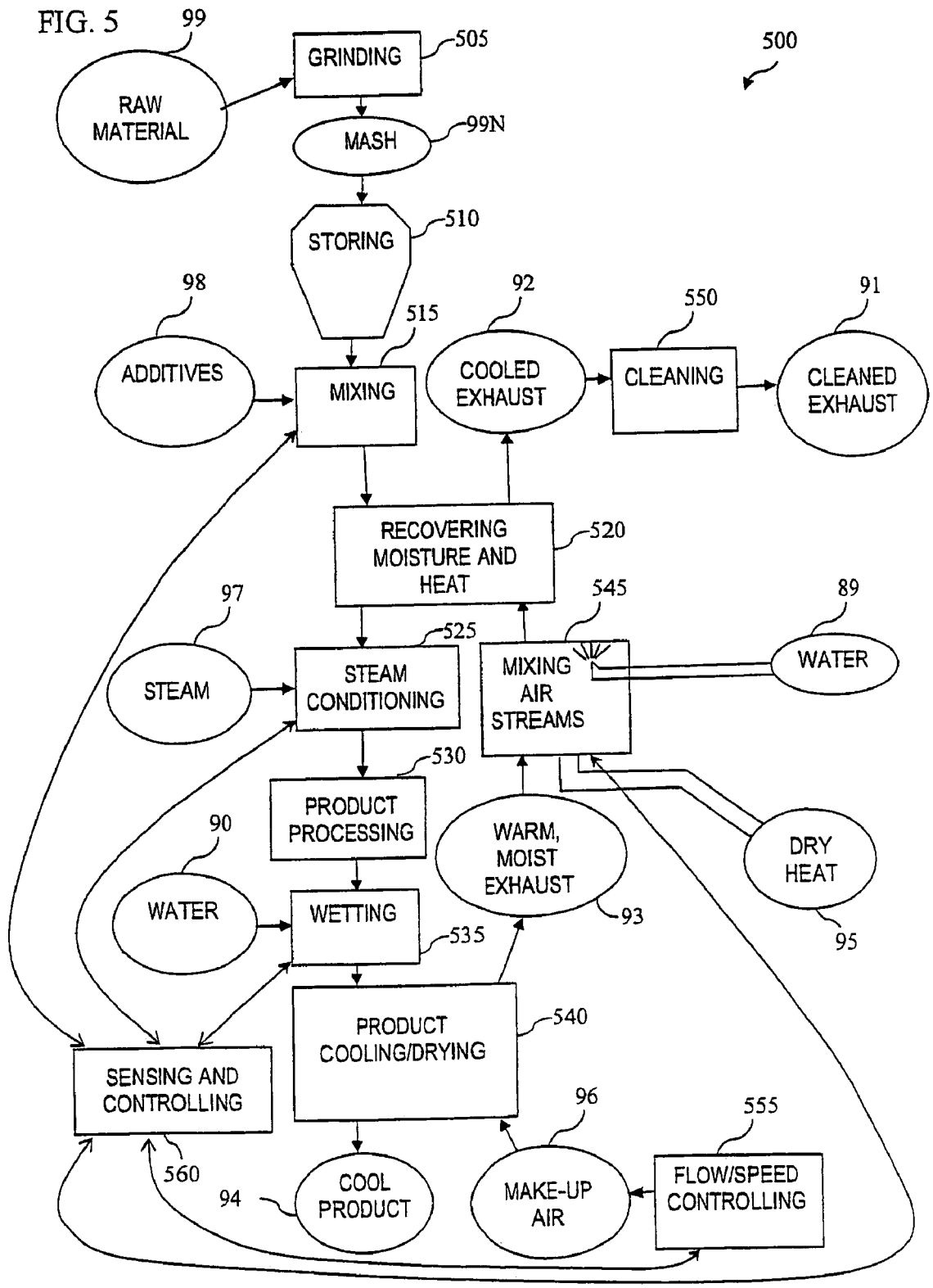
FIG. 5 is a flowchart of a method 500 of some embodiments of the invention used for agricultural-product production with heat and moisture recovery and control.

FIG. 5 is a flowchart of a method 500 according to some embodiments of the invention. Method 500 includes grinding 505 the raw material 99 to some consistency suitable for the uses of method 500. After grinding raw material 99, the material becomes a milled material 99'. In some embodiments of the invention, milled material 99' is stored 510. This storage provides a buffer for the flow of material within method 500. As grinding rates or raw material amounts increase, more material is stored 510. Similarly, as grinding rates or raw material amounts decrease, less material is stored. This allows for a constant and consistent stream of material to flow from storage through the rest of method 500.

Material which leaves storage is then subjected to a process of ration mixing 515. In mixing rations, ration additives 98 are combined with the milled material 99' to form mash, sometimes called processed product, milled product, or feedstuff. Ration additives 98 may include combinations of other grains (to improve nutrient value of the resulting agricultural product), protein-rich concentrates, carbohydrate-enrichments, fat-rich additives, *Lactobacillus acidophilis* and *Lactobacillus bulgarium* ("to provide a non-hygroscopic free-flowing, self-preserving animal feed supplement"), lactic acid (for foodstuff preservation), mineral substances, antibiotics, enzymes, hormones, trace elements, vitamins, pharmaceuticals, and/or preservatives.

In some embodiments of the invention, mash coming from ration mixing 515 is input into a device which is used for recovering moisture and heat 520. This function allows for cost-efficiency and cost-cutting methods in the production of agricultural products by using moisture and heat taken from the pellet cooling and drying stage later in method 500. Recovering moisture and heat permits heat and moisture that is unnecessary and undesirable in final agricultural products and is removed from the product later in method 500, to be added to mash coming from ration mixing 515 in order to preheat and premoisturize the mash. Recovery of moisture and heat may be done through a co-flow system (both mash and air flow in the same direction), a cross-flow system (mash flows horizontally and air flows vertically) or a counter-flow system (mash and air flow in opposite directions).

Mash which has been exposed to the recovered moisture and heat next undergoes steam conditioning 525. In steam conditioning 525, steam 97 is injected into the mash. The amount of steam 97 used in steam conditioning 525 is variable depending upon temperature and moisture content of raw material 99. The amount of steam 97 used will decrease in warmer temperatures, such as in the summer months, because hot material and air have a greater moisture-holding capacity than colder material and air. In warmer temperatures, 2 to 3 points of steam is injected. In colder temperatures, such as in the winter months, 4 to 5 points of steam may be injected. Material which has been steam conditioned will contain, e.g., a moisture content of 17 or 18 points and a temperature of 200 degrees Fahrenheit.

Mash is next subjected to product processing 530. In some embodiments, the mash is converted to pellets. The mash is pushed and squeezed in a pellet mill through holes in a die face. A cutter will then cut the product, creating formed and shaped pellets having temperatures of, e.g., 200 degrees Fahrenheit (93 degrees Celsius).

In some embodiments of the invention, wetting 535 is included in method 500. Water 90 is sprayed onto the outer surface of the product before the product is cooled 540. Spraying water on the product provides, for example, an additional one percent of moisture on the product, which makes up part of the 3% of moisture removed from the product in the product cooling and drying process 540 later in method 500. Adding this additional moisture to the product before the drying process, allows the cool product 94 to be less fragile and have a higher durability, thus making a better quality product. Water spraying is done in warmer temperatures, such as in the summer months, when ambient air temperatures are higher and cooling and drying product removes a larger amount of moisture from the product. Cooling and drying the product 540 is done until the product is at a temperature suitable for storage, e.g., within ten degrees Fahrenheit (6 degrees Celsius) of ambient air temperature. Cooling and drying may be done with either a co-flow or counter-flow device. Counter-flow devices provide for a higher degree of heat transfer between the air and product, allowing the air exhaust, warm, moist exhaust 93, to reach a temperature close to the temperature of the incoming product, and the output product, cool product 94, to reach a temperature close to the incoming air temperature.

In embodiments in which a counter-flow device is used, product cooling and drying 540 necessitates the use of make-up air 96, input near one end of the product cooling and drying device, to cool and dry the agricultural product entered at the opposite end. Air flowing through the device cools and dries the agricultural product, picking up moisture and heat through direct contact with the product. At the opposite end from its input position, make-up air 96 escapes the cooler as the warm, moist exhaust 93. This exhaust air is warm, moist, possibly oily, and particulate-laden.

Speed of make-up air used in product cooling and drying may be varied through a device used for flow/speed controlling 555. Flow/speed controlling 555 may be adjusted due to changes in ambient air temperature. When ambient air temperature is cooler, such as in winter months, less moisture is transferred from the product to the make-up air when product is cooled and dried 540. This results in cool product 94 with a higher moisture content, which may cause moldy product and is unsuitable for product storage. Controlling the flow of air used in product cooling and drying remedies this problem by slowing the air flow to allow for a higher level of moisture transfer in product drying. When ambient air temperatures rise, air flow is again increased.

In some embodiments, air which has been used in product cooling and drying 540 and which is given off as the warm, moist exhaust 93, is mixed with air streams 545. In some embodiments, these air streams are exclusively composed of dry heat. Both temperature and flow rate of these air streams may be adjusted based on measurements of air temperature and moisture content of ambient air and temperature of the warm, moist exhaust 93. When ambient air temperature is cooler, the make-up air 96 used in product cooling and drying 540 does not heat up to high enough temperatures in the product cooling process. When this air is given off as warm, moist exhaust 93, the temperature of the exhaust is not yet sufficient to heat up the mash in the moisture-and-heat-recovery stage of method 500. Therefore, dry heat must be added to make up for this temperature differential. Since this exhaust air already contains sufficient levels of moisture to premoisturize the mash, adding additional moisture to warm, moist exhaust air 93 would make the mash too wet and cause "roll slip" in the pellet mill. Therefore, in some embodiments, dry heat is added by mixing air streams 545 to the warm, moist exhaust 93, raising the temperature of the exhaust air to, e.g., 160, 180, or 200 degrees Fahrenheit (71, 82, or 93 degrees Celsius). A similar process may be required in summer months to reduce the moisture content of the warm, moist exhaust 93 if the warm, moist exhaust air becomes too saturated.

Moisture and heat from exhaust air 93 is then recovered and injected into milled material 99' to premoisturize and preheat the material 99'. In recovering the moisture and heat 520, heat and moisture from the warm, moist exhaust 93 are removed and absorbed into the milled material 99'. In some embodiments, exhaust air 93 contains a high oil and particulate content that will foul a typical heat-recovery device, and which need to be removed from the exhaust stream before the air is released to the outside to avoid polluting the environment. As the hot, moist exhaust air 93 is forced through the agricultural product, the exhaust stream is cleaned of at least part of the oil and particulate content. Undesirable and unused particulates and other waste products in warm, moist exhaust 93 become the heat recovery's exhaust 92, which is then cleaned 550 and discarded as cleaner's exhaust 91.

In some embodiments of the invention, a method for controlling various aspects of method 500, including the overall flow of method 500, is included. Measurements that are used for controlling the method 500 include ambient air temperature, product temperature, exhaust air temperature, air humidity levels, product levels, flow rates, and/or the amount of moisture and heat transfer as product is cooled and dried 540. These measurements are used to adjust the mixing of rations 515, steam conditioning 525, wetting 535, controlling make-up air flow/speed 555, and the mixing of air streams 545.

Figure 6:
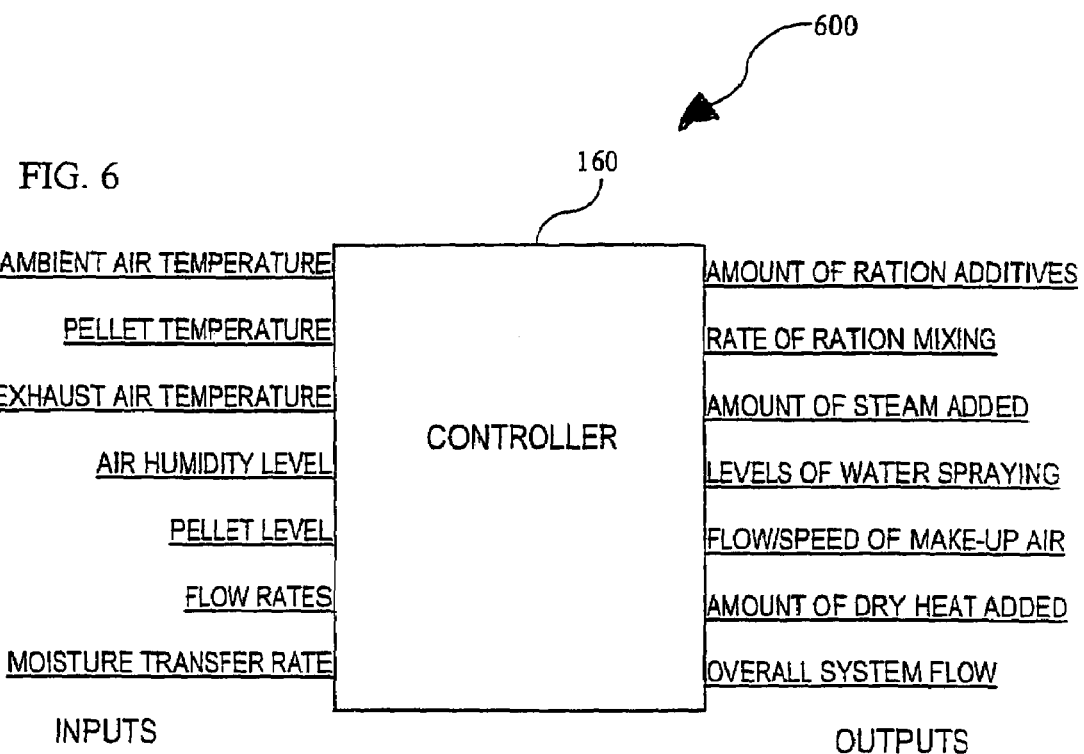
FIG. 6 is a block diagram of functions of a controller 600 of some embodiments.

FIG. 6 is a diagram of functions of a controller system 600 that includes controller 160. Controller 160 takes measurements throughout an agricultural-product-production system and receives signals corresponding to these measurements as inputs to control various actions throughout the system, which are the outputs of controller 160. Input measurements used by a controller include temperatures of such items as ambient air, pellets, and exhaust air. Air humidity level is also measured for both the ambient air and exhaust air. Inputs from the pellet cooler and dryer device include pellet level, air-flow rate, and moisture transfer rate. Flow rates for the entire production system are also measured and used as inputs by the controller.

In some embodiments of the invention, the controller system 600 regulates a number of devices throughout the agricultural-product-production process. Included in the devices and actions regulated are the amount of ration additives added by the ration mixer, the rate at which these additives are added, and the amount of steam injected to the mash by the steam conditioner. The amount of water sprayed by the water sprayer and the flow and speed of make-up air are also regulated, at least in part based upon the temperature of ambient air. Further along in the system, the amount of dry heat that is added by the mixer is adjusted by the controller. Overall, the general flow of the system is also regulated by the controller to ensure a consistent, constant and uniform production process that generates a high-quality final product.

Figure 7:
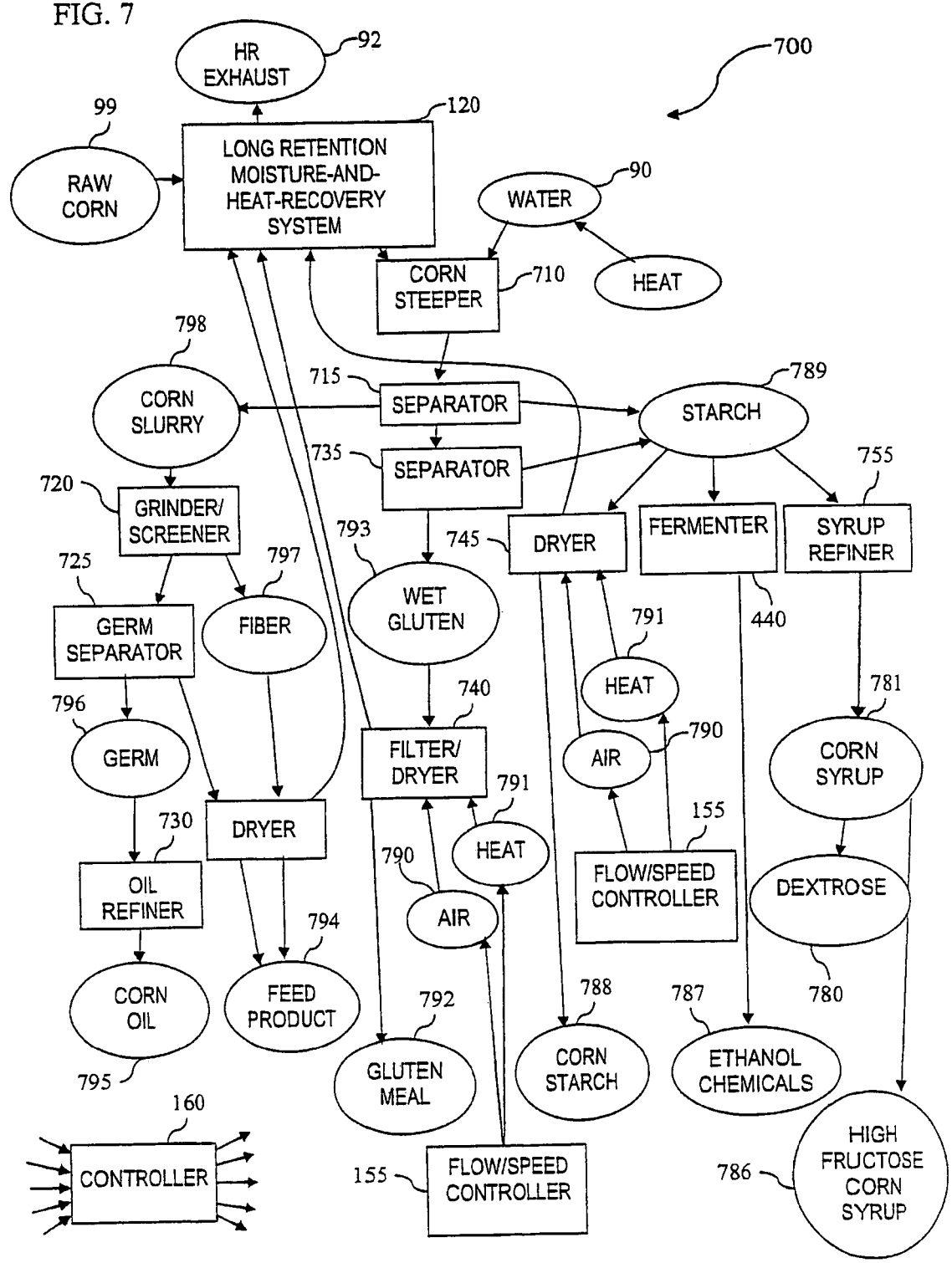
FIG. 7 is a block diagram of a system 700 of some embodiments of the invention used in wet corn milling with heat and moisture recovery and control.

FIG. 7 is a block diagram of a system 700 used in wet corn milling with heat and moisture recovery and control. In some embodiments, raw corn 99 is input into system 700 and goes through a long-retention moisture-and-heat-recovery system 120. Recovery system 120 takes heat and moisture from dryers 740 and 745 later in system 700 and combines this heat and moisture with the raw corn 99, thereby preheating and pre-moisturizing the corn. This preheat and pre-moisturization cuts down on the amount of heat and moisture that must be added at corn steeper 710, reducing operating costs of system 700. In some embodiments, moisture-and-heat-recovery system 120 is a counter-flow device in which hot, moist air is input into the bottom of recovery system 120 and raw corn is input in the top of recovery system 120. The air and corn are mixed together, cooling the output air to a temperature near that of the incoming corn and heating the output corn to a temperature near that of the incoming air. Output from recovery system 120 includes hot, moist corn, which is sent to corn steeper 710, and cooler, dryer exhaust air 92.

In some embodiments, preheated and premoisturized corn output from moisture-and-heat-recovery system 120 is input into corn steeper 710. Water 90 and heat 95 are also injected into corn steeper 710. In some embodiments, the corn is soaked in water for between 24 and 48 hours, or until the corn has achieved a consistency suitable for separating the corn into its component parts. This soaked corn is then output from corn steeper 710 and input into a series of separators 715 and 735.

After the corn has gone through corn steeper 710, it is separated into starch, corn slurry and wet gluten by separators 715 and 735. These two distinct separations mark the breakdown of wet corn milling into three processes which produce a number of different products including corn oil 795, feed product 794, gluten meal 792, corn starch 788, ethanol chemicals 787, and high fructose corn syrup 786.

Corn slurry 798 is separated off from the other two processes by the first separator 715. The slurry is processed through a grinder/screener 720 which separates fiber 797 out from the slurry. Fiber 797 will become feed product 794. The component of the slurry not separated as fiber is then injected into a germ separator 725 which further separates additional fibers from the corn germ 796. These fibers may also be used to create feed product 794. In some embodiments, the corn germ 796 is input into an oil refiner 730 which extracts corn oil 795 from the corn germ 796.

First separator 715 also separates a starch component out from the corn material output from corn steeper 710, leaving a mixture of the steamed corn material to be further processed by second separator 735. Second separator 735 separates additional starch 789 from wet gluten 793. In some embodiments, separator 735 is a centrifugal separator. In other embodiments, separator 735 is a screen separator. In still other embodiments, separator 735 is a hydrochloric separator.

Wet gluten 793 separated from starch 789 is put through a filter and dryer 740. In some embodiments, dryer 740 is a counter-flow device. Cool air 790 and possibly heat 791 are input into the base of dryer 740, where the air mixes with the wet gluten product 793, input at the top of dryer 740. The air and gluten travel in opposite directions, allowing a larger amount of heat and moisture to transfer between the air and gluten. Moist air output from dryer 740 achieves a temperature nearly the same as the temperature of the input gluten, while dried gluten meal 792 output from dryer 740 nearly reaches the temperature of input air 790. Exhaust air from dryer 740 is conducted back to moisture-and-heat-recovery system 120 and is used to preheat and premoisturize the raw corn 799. In some embodiments, the flow and speed of input air 790 and heat 791 is controlled by flow/speed controller 155 and is adjusted based at least in part on temperature measurements of ambient air and input material.

Starch 789 is separated from the other two processes through both separator 715 and separator 735. Starch 789 may be used to make products including corn starch, ethanol chemicals, and/or corn syrup, depending upon the process used.

To make corn starch 788, starch 789 is input into dryer 745. In some embodiments, dryer 745 is a counter-flow device. Cool air 790 and heat 791 are input into the base of dryer 745, where the air and possibly heat mix with starch 789 input at the top of dryer 745. The air and starch travel in opposite directions, allowing the starch to reach temperatures near that of the incoming air and the air to achieve temperatures near that of the incoming starch. Outputs from dryer 745 include exhaust air out the top of the dryer and corn starch 788 out the bottom of the dryer. Exhaust air from dryer 745 is conducted back to moisture-and-heat-recovery system 120, where it is combined with the raw corn 99. The flow and speed of input air 790 is controlled by flow/speed controller 155.

In some embodiments, ethanol chemicals are produced from starch 789. Starch 789 is input into fermenter 440, where it is kept cool and is combined with yeast to convert sugar to ethanol and carbon dioxide. The starch may be kept in fermenter 440 for between 40 and 50 hours. At the end of this time, ethanol chemicals 787 are removed from fermenter 440 which may be further processed or stored.

Starch 789 may also be processed into high-fructose corn syrup 786. In this process, the starch 789 is input into syrup refiner 755, where it is made into corn syrup 781. This corn syrup is further processed and dextrose 780 is removed. The removal of dextrose from the corn syrup creates high fructose corn syrup 786 which may be stored or transported for use.

Controller 160 is used to control a number of features of the devices within system 700 based upon a plurality of measurements. Measurements input into controller 160 include temperatures of ambient air, dryer heat, and raw materials, as well as flow speed and moisture content levels throughout system 700. Outputs from controller 160 include controlling the flow speed of the dryers 740 and 745, along with the overall flow speed of system 700, heat and moisture content levels throughout system 700 and within the numerous devices, and temperature levels throughout system 700.

Figure 8:
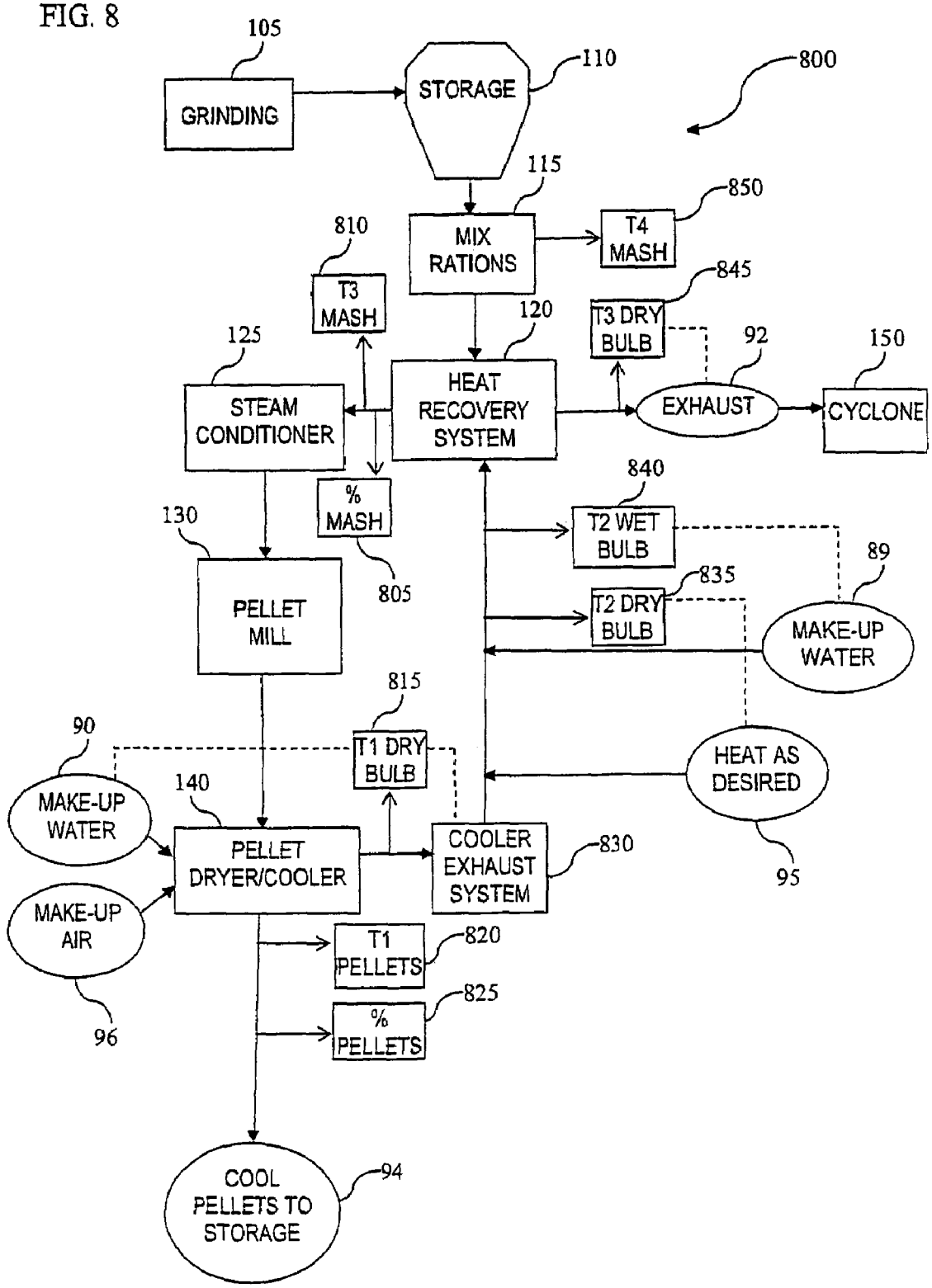
FIG. 8 is a block diagram of a system 800 of some embodiments of the invention that provides agricultural-product production with heat- and moisture-recovery and control.

FIG. 8 is a block diagram of a system 800 of some embodiments of the invention, indicating a plurality of parameters which are measured throughout system 800. The system and method of FIG. 1 (described above), FIG. 8 and/or FIG. 10 (described below) can be used for making feed pellets from materials such as corn, silage, or other crops, or for making fuel pellets from materials such as wood fiber, turkey manure, or other biomass. The process for making feed pellets is described in detail above. The fuel-pellet process is similar. In some embodiments, the pelletizing process for wood includes drying, grinding, conditioning, pelleting/extrusion, cooling and screening to produce pellets that have high density, improved material-handling characteristics. The pellet shape is conducive to automatic burner-infeed systems, such as used in residential wood-pellet fed stoves or furnaces.

In some embodiments, as part of the grinding block 105 of FIG. 1, incoming wood fibers (for making into fuel pellets) are screened or sorted to remove tramp material and foreign objects (such as stones, metal, and dirt) in order to improve machinery life and reduce ash content of the burned pellets. In some embodiments, the input wood is kiln dried (KD) and/or dried in rotary drum driers to obtain, e.g., 7% to 10% wet basis moisture (e.g., in some embodiments, 5%, 6%, 7%, 8%, 9%, 10%, 11%, 12%, 13%, 14%, or 15%). In some embodiments, the raw material is reduced to pieces no larger than about 5 cm. by 5 cm. by 1 cm. using a primary grind hog and then finely ground using a final grind hammer mill. In some embodiments, the grinding operation is performed before drying in order to expose more surface area and make the drying process faster, more even (since the ground wood material has a more even particle size, each piece dries to the same extent) and more efficient. Often, it requires more horsepower to grind wet wood fiber than it does for dry material, so some embodiments dry first, and then grind.

In some embodiments, the finely ground material from block 105 then goes to a buffer storage 110 that provides an even flow rate of material fed to block 120 to be pre-heated and pre-moisturized by the warm moist exhaust 93 of the cooler/dryer 140, and then at block 125, the wood material is steam or water conditioned to heat the fibers and apply a thin layer of moisture to the wood particles. The heat recovery of block 120 reduces the amount of steam or hot water needed at block 125. To bind the wood fiber into a pellet, the temperature of the material must be raised to about 220 to 240 degrees Fahrenheit (104 to 116 degrees C.), so that the lignins in the wood material gelatinize and bind the fiber during the pelletizing (as compared to the starches that gelatinize in grain when processing into pellets). This reduces the amount of mechanical energy otherwise required to pelletize the wood material, increasing throughput and reducing wear on the machinery. Alternatively, rather than steam conditioning, water conditioning can be used, where water is added to assist in lubricating the fiber for extrusion at block 130. At block 130, the wood fibers are formed into pellets (in some embodiments, these pellets are about 6 mm diameter and about 18 mm long, but dimensions can vary), and the pellets are cooled and dried at block 140 to output cooled fuel pellets 94 and warm moist exhaust 93 that is used at block 120 to pre-heat and pre-moisturize the ground wood material before steam conditioning. The buffer storage 110 allows a more even/constant flow rate of material to pelletizing block 130, in order to run the pelletizer at or near its design throughput capacity. The material and thickness of the pelletizer are chosen to accommodate the wood species being pelletized, and in some embodiments, will use stainless steel or carbon-steel alloy, and have an open area of the dies of about forty percent. In some embodiments, pelletizing will increase the bulk density four fold (e.g., from about 160 kilogram/cubic meter to 640 kg/cubic meter), increasing the energy density of the material.

Optionally, the pellets can have additional water added at block 135 before cooling, in order to prevent excess drying and obtain a desired moisture content of the final product. In some embodiments, as the pellets exit the pelletizing mill, they will flash off about one to two percent water, and then have about eight percent moisture content and 93 degrees C. In some embodiments, the final pellets are dried to about 6.5 percent moisture. In some embodiments, the pellets are screened to remove "fines" (e.g., a screen of 4.5 mm openings is used for pellets having a 6 mm diameter) and are then bagged. The bagging is typically done by weight, and the bags are sealed by heat. The bags are stacked on a pallet (e.g., 50 bags of 40 pounds each for a short ton, or 50 bags of 20 kg each for a metric ton), and are shrink-wrapped). The fines are recycled into the input stream of wood material for reprocessing. In a well-run system, less than three percent fines will need to be removed. In some embodiments, the weight of the fines is measured, and if fines exceed five percent (indicating something is wrong in the process), the system is adjusted (e.g., the moisture and/or heat of the steam conditioning is increased).

Other features of system 800 are as described in FIG. 1. In some embodiments of the invention, mash temperature 850 is taken as the agricultural material is within ration mixer 115. This temperature is used as a basis on which to compare temperature measurements from later in system 800 and to adjust production devices within system 800, such as heat-recovery system 120 being adjusted to inject more or less heat into incoming material, or pellet cooler/dryer 140 to add more make-up water 90 or make-up air 96. In some embodiments, make-up water 90 is added by a pellet wetter (e.g., sprayer) that, e.g., sprays water on the pellets entering pellet dryer/cooler 140.

In some embodiments, mash moisture-content measurement 805 and temperature measurement 810 are taken after mash is output from heat-recovery system 120. These measurements are sent to controller 160 and are used to control parameters throughout system 800, such as the amount of heat and moisture transferred into incoming mash within heat recovery system 120, the amount and/or quality of steam added by steam conditioner 125, the temperature and flow of make-up air 96, and the additional make-up water 90 to be added.

Measurements are also taken that pertain to the cooled pellet output from pellet dryer/cooler 140. Measurements are made of moisture content 825 of output pellets and temperature 820 of output pellets. By adjusting parameters throughout system 800, pellet temperature and moisture can be controlled and maintain a substantially constant, ideal moisture content and temperature. In some embodiments, this is done by adding make-up water 90 if moisture content of cooled pellets 94 is too low and by reducing the flow of make-up air if moisture content of cooled pellets 94 is too high.

Temperature of exhaust air from pellet dryer/cooler 140 is also measured 815 and regulated to maintain a desired temperature. If the measured temperature of exhaust air 815 is too high, controller 160 allows for additional make-up water 90 and/or make-up water 89 to be added to system 800. This allows for control of water-mass balance independent of pelleting and increases the amount of evaporative cooling in the unit, lowering the cooler outlet temperature. Also, by increasing the surface moisture on the pellets, less internal pellet moisture is evaporated by the cooler/dryer 140, which improves pellet durability and moisture content. If the measured temperature of exhaust air 815 is too low, airflow on the cooler exhaust system is reduced. This reduction in airflow proportionately increases air temperature across the dryer/cooler, while increasing the maximum possible humidity ratio (the moisture content), thereby removing more water from the pellets.

Dry-bulb and wet-bulb temperatures are measured in the dryer/cooler exhaust system 830 to determine the amount of additional heat 95 and make-up water 89 and/or 90 required. The heat-recovery air infeed dry-bulb temperature 835 is measured and used to control the amount of additional heat added into the system. If the temperature measurement 835 is too low, additional heat will be added, whereas if the temperature measurement 835 is too high, cool air will be added or heat will be turned off. Similarly, heat recovery air infeed wet-bulb temperature 840 is measured and used to control the amount of make up water added to the dryer/cooler exhaust air stream. Wet-bulb temperatures below the desired temperature will cause additional water to be added to dryer/cooler exhaust system 93, whereas measured temperatures above the desired temperature will cause the water level to be reduced or turned off. In some embodiments, setup points for both the wet-bulb and dry-bulb temperatures are based on the desired mash temperature and moisture content and are set to control condensation and latent heat recovery in system 800.

In some embodiments of the invention, airflow 92 out of heat-recovery system 120 is also measured to control aspects of system 800. Heat-recovery air-outfeed dry-bulb temperature 845 is used to control airflow speed and volume through the recovery system. Temperatures that are higher than the desired level signal controller 160 to reduce the amount of airflow from the exhaust system, whereas temperatures lower than the desired level signal controller 160 to increase the amount of airflow from the exhaust system.

In some embodiments, a system and method of the present invention similar to system 800 of FIG. 8 is used to produce steam-flaked corn, sorghum, or other grain having improved net energy for animal feed. In other embodiments, the system and method of the present invention is used for steam-rolling grain, a common processing method for barley, corn, and wheat used in dairy concentrates. For steam rolling, the grains are usually steamed for 15 minutes or less to increase grain moisture to about 15 percent and then crushed with various sizes of rollers to produce a thick flake without a specific flake density endpoint, usually about 438 to 540 g/L for corn and sorghum (34 to 42 lb./bu., in units as used in the industry).

The system for steam flaking is a more extensive processing system (with careful quality control) than dry-rolling or steam-rolling grain. In some embodiments, a system similar to system 800 is used, except the following units are omitted: grinding 105, storing 110, ration mixing 115. The incoming whole grain (such as corn) is introduced to heat-recovery system 120 and preheated and premoisturized with warm moist exhaust air. In some embodiments, the whole grain is steamed for 30 to 60 minutes in a vertical, stainless steel steam chamber 125 (for example, one that is 3.1 to 9.2 m high and 91 to 183 cm in diameter) to increase grain moisture to about 18 to 20% and then flaked between preheated large rollers (not shown) in place of pellet mill 130. The rollers have a close-tolerance thin spacing (e.g., 46 cm diameter by 76 to 91 cm length or 61 cm diameter by 122 cm length) to obtain a specific final desired flake density (in some embodiments, about 309 to about 386 g/L or 24 to 30 lb/bu). In place of pellet dryer/cooler 140, a flake dryer cooler is used, and cool flakes (rather than cool pellets 94) are generated, having a desired temperature and moisture content as measured and controlled by the controller. Rather than starting with ground grain and ending with pellets, this process starts with whole grain and ends with flakes, but is otherwise the same as shown in FIG. 8 and FIG. 1.

In some embodiments, the grain is steam flaked to a flake density of about 360 g/L. In some embodiments, the grain is steam flaked to a flake density of about 290 g/L. In some embodiments, the grain is steam flaked to a flake density of about 300 g/L. In some embodiments, the grain is steam flaked to a flake density of about 310 g/L. In some embodiments, the grain is steam flaked to a flake density of about 320 g/L. In some embodiments, the grain is steam flaked to a flake density of about 330 g/L. In some embodiments, the grain is steam flaked to a flake density of about 340 g/L. In some embodiments, the grain is steam flaked to a flake density of about 350 g/L. In some embodiments, the grain is steam flaked to a flake density of about 370 g/L. In some embodiments, the grain is steam flaked to a flake density of about 380 g/L. In some embodiments, the grain is steam flaked to a flake density of about 390 g/L. In some embodiments, the grain is steam flaked to a flake density of about 400 g/L. The rollers become hot as the steamed grain passes through, which is important in the flaking process. The extent of processing (flaking pressure) increases as flake density decreases (i.e., 309 g/L flake is more extensively processed than a 386 g/L flake). The quality of steam-flaked grain is routinely measured by flake density, and by laboratory methods (enzymatic starch hydrolysis or percent starch gelatinization). In some embodiments, a cooling/drying device 140 is used to cool and dry the flaked grain, and to obtain warm moist air (by exhaust system 830) that is used to preheat the incoming whole grain.

In other embodiments, steam rolling of grain is performed by the present invention. This is similar to the process for steam flaking with heat recovery described above, except that less steam cooking is done, and the rollers do not squeeze the product as thin.

Figure 9:
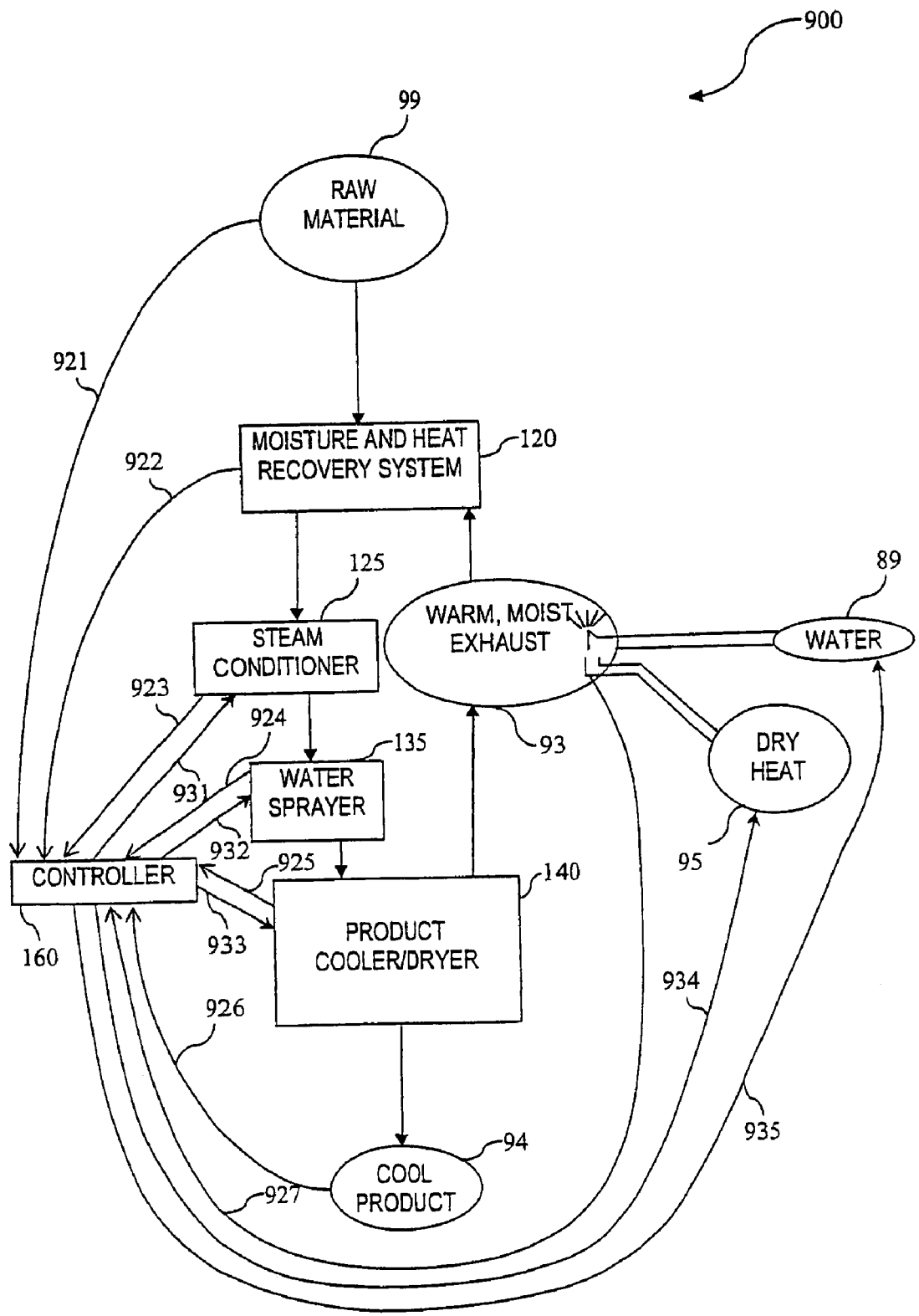
FIG. 9 is an abstract block diagram of a system 900 of some embodiments of the invention that provides agricultural-product production with heat-and-moisture-recovery and control.

FIG. 9 is an abstract block diagram of a system 900 of some embodiments that provides agricultural-product production with heat-and-moisture-recovery and control. Sensors and controls are indicated in FIG. 9, with other aspects of FIG. 9 as described in FIG. 1.

In some embodiments, sensors 921-927 transmit measurements and other data from material and devices throughout system 900 to controller 160. In some embodiments, sensor 921 transmits temperature measurements of the raw material 99 to controller 160. Sensor 922 in some embodiments transmits measurements including moisture-content and temperature of mash. Moisture-content and temperature measurements are also taken by sensors 925, 926, and 927 at different points in system 900. Measurements taken at steam conditioner 125 by sensor 923 and by sensor 924 at water sprayer 135 measure quality of steam and additional water levels, respectively.

In some such embodiments, controller 160 makes adjustments to devices within system 900 based at least in part on feedback from sensors 921-927. Controller 160 then sends control outputs 931-935 to a plurality of points throughout system 900. In some embodiments, control 931 regulates the temperature, quality, and amount of steam added by steam conditioner 125, and control 932 adjusts the temperature, rate, and amount of water added by water sprayer 135. In some embodiments, control 933 is used to make adjustments to product cooler/dryer 140, including material flow and air flow adjustments. Sensors 934 and 935 are provided in some embodiments to make adjustments in the moisture-content and temperature of warm, moist exhaust air 93. Sensor 934 adjusts the amount of dry heat 95 added to warm, moist exhaust air 93, while sensor 935 regulates the amount of additional water 89 added to exhaust 93.

Figure 10:
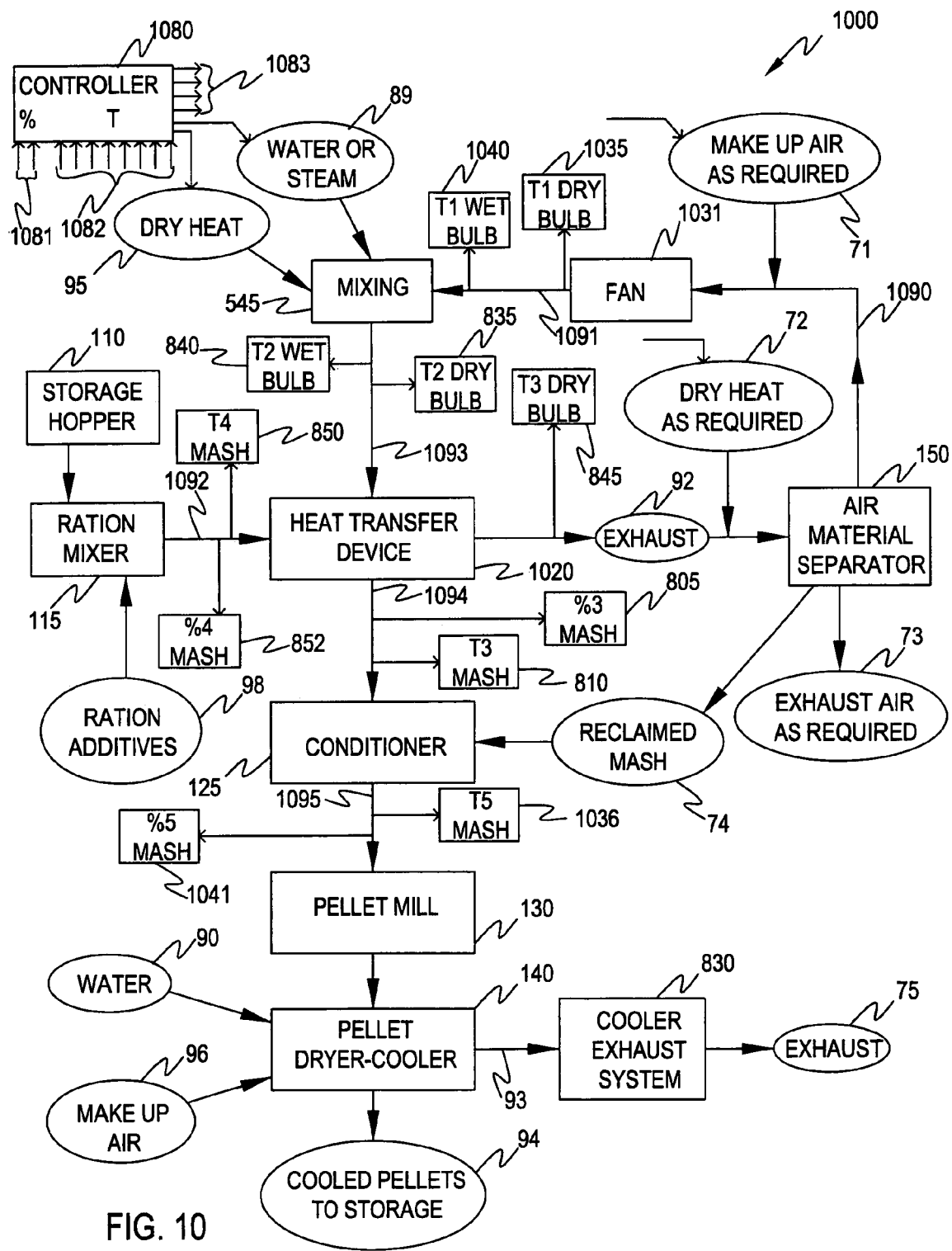
FIG. 10 is a block diagram of a system 1000 of some embodiments of the invention that provides agricultural-product production with improved heat and moisture control and, optionally, some heat recovery.

FIG. 10 is a block diagram of a system 1000 of some embodiments of the invention that provides agricultural-product production with improved heat and moisture control. The units and functions shown in FIG. 10 are much the same as for the units and functions having corresponding reference numbers in FIG. 8. One primary difference is that controller 1080 controls the temperature and moisture content of an air stream coming solely from block 71 (which provides make-up air as required), and/or from block 150 wherein the cleaned somewhat warm and somewhat moist exhaust from air-material separator (i.e., cleaner) 150 is recycled. In this embodiment, the warm moist exhaust from dryer-cooler 140 is optionally cleaned at block 830 and is then exhausted rather than being recycled to block 1020. The system and method of FIG. 10 can be used for making feed pellets from materials such as corn, silage, or other crops, or for making fuel pellets from materials such as wood fiber, turkey manure, or other biomass.

In some embodiments, the starting material is placed in a buffer storage 110 that provides an even flow rate of material 1092 fed to heat-transfer device (also called a moisture-and-heat-transfer unit or a pre-conditioner) 1020 to be pre-heated and pre-moisturized by the warm moist air flow 1093 whose wet-bulb temperature T2 840 and dry-bulb temperature T2 835 are controlled by controller 1080 based on a plurality of temperature and/or moisture measurements. Optionally, a ration mixer 115 that mixes ration additives 98 into the material coming from buffer storage 110 before passing to heat-transfer device 1020. In some embodiments, heat-transfer device 1020 is a counterflow air-material-direct-contact heat-transfer device as described above for device 120.

In some embodiments, the output percentage moisture content (%3) 805 and temperature (T3) 810 of the mash 1094 are controlled (their values are kept substantially constant in spite of a wide range of external temperatures and humidities) in order to maintain a consistent predictable process control of the overall method, which then produces higher-quality product. Controller 1080 receives moisture parameters 1081 as measured by various sensors 852 and/or 805, and temperature parameters 1082 as measured by various sensors 850, 840, 1032, 1033, 845 and/or the like, and generates control signals 1083. Control signals 1083 are used, for example, to control the amount of dry heat 95 and moisture or steam 89 that are added by mixer 545 to the input air stream 1091. In some embodiments, the %4 mash-moisture-content signal 852 and the T4 mash-temperature signal 850 measurements of the input mash 1092 and the %3 mash-moisture-content signal 805 and the T3 mash-temperature signal 835 measurements of the output mash 1094 (the mash going into conditioner 125 if that is implemented, or into pellet mill 130 or other processor if no conditioner is implemented) are input to controller 1080 in order to control the temperature and moisture content of mash 1094 by controlling the moisture and temperature of air stream 1093. In some embodiments, the T1 wet-bulb temperature signal 1040 and the T1 dry-bulb temperature signal 1035 measurements of the input air stream 1091 and the T2 wet-bulb temperature signal 840 and the T2 dry-bulb temperature signal 835 measurements of the output air stream 1093 are input to controller 1080 in order to control the temperature and moisture content of output stream 1093. In some embodiments, control signals 1083 are also used to control fan 1031, the amount of make-up air 71 added to cleaned exhaust 1090, the amount of exhaust air 73 that is dumped from cleaner 150, the amount of dry heat 72 that is added before cleaner 150 to the exhaust 92 coming from heat-transfer device 1020 (based on dry-bulb temperature 845), and other controlled functions. In some embodiments, the method includes varying a flow rate of air 1091 that is input to heat-transfer device 1020 for the warming and moisturizing of the incoming mash, by varying the speed of fan/blower 1031. Exhaust air 73 that is not needed in air stream 1090 is dumped out of the system. In some embodiments, solids that are recovered by separator 150 are optionally reclaimed and inserted to the mash entering steam conditioner 125. The need for supplemental makeup air 71 and supplemental dry heat 72 is dependent on the type of air-material separator used for separator 150 and the type of dry heat. If a bag filter is used for separator 150 and the exhaust 92 is at or near saturation, there may be a need for dry heat 72, in some embodiments. If the dry heat sources for items 72 and/or 95 are from direct-fired burners, some embodiments add enough air into unit 72 or make up air 71 to fire the burners. If the dry heat is from steam coils or other indirect sources, some embodiments are able to close the loop and not add makeup air.

In some embodiments, at block 125, the material is steam and/or water conditioned in order to heat the material and/or apply a thin layer of moisture to the material. In some embodiments, at block 125 a controlled amount steam or hot water is added to the mash under the control of controller 1080, with little or no air, in some embodiments. The heat and moisture transfer that occurs at block 1020 reduces the amount of, or eliminates the need for steam or hot water to be added at block 125. In other embodiments, no steam is added at conditioner block 125, since the heat and moisture transferred from the heated moist air 1093 in heat-transfer device 1020 is sufficient to eliminate the need for steam. In some embodiments, running the mash through conditioner 125 (i.e., "conditioning" the mash), even in embodiments that do not add steam here, provides an amount of time-at-temperature ("cooking time") for the chemical reaction that occurs in the heated mash and that breaks down and gelatinizes starches in the mash. In some embodiments, the conditioning includes transporting the mash, under control of controller 1080, through the conditioner (optionally with a predetermined amount of stirring, turbulence, or agitation) at a controlled speed that provides a predetermined time-at-temperature profile (including, in some embodiments, a predetermined temperature change) over a predetermined period of time to achieve the desired "cooking" or conditioning. In some embodiments, the speed and/or amount of agitation is adjustable and can be varied by controller 1080. This conditioning or "cooking" further softens the mash and reduces the amount of mechanical energy otherwise required to process the material, increasing throughput and reducing wear on the machinery. Alternatively, rather than steam conditioning, water conditioning can be used at block 125, where water is added to assist in lubricating the fiber for extrusion at block 130. At block 130, the heated moisturized material is formed into pellets, and the pellets are cooled and dried at block 140 to output cooled fuel pellets 94 and warm moist exhaust 93. In some embodiments, exhaust 93 is cooled and/or cleaned before being output as exhaust 75, and is not routed to block 1020 to pre-heat and pre-moisturize the material before steam conditioning.

Optionally, the pellets can have additional water 90 and/or make-up air 96 added at block 130 before and during cooling, in order to prevent excess drying and obtain a desired moisture content of the final product.

Other features of system 1000 are as described in FIG. 1. In some embodiments of the invention, mash temperature 850 is taken as the input agricultural material is within ration mixer 115. This temperature is used as a basis on which to compare temperature measurements from later in system 1000 and to adjust production devices within system 1000, such as heat-transfer system 1020 being adjusted to add more or less heat into incoming material, or pellet cooler/dryer 140 to add more make-up water 90 or make-up air 96. In some embodiments, mash moisture-content measurement 805 and temperature measurement 810 are taken after mash is output from heat-recovery system 120. These measurements are sent to controller 1080 and are used to control parameters throughout system 1000, such as the amount of heat 95 and moisture 89 transferred into incoming mash 1092 within heat-transfer system 1020, the amount and/or quality of steam added by steam conditioner 125, the temperature and flow of make-up air 96, and the additional make-up water 90 to be added.

In some embodiments, measurements are also taken that pertain to the cooled pellet output from pellet dryer/cooler 140. By adjusting parameters throughout system 1000, pellet temperature and moisture can be controlled and maintain a substantially constant, ideal moisture content and temperature.

Figure 11:
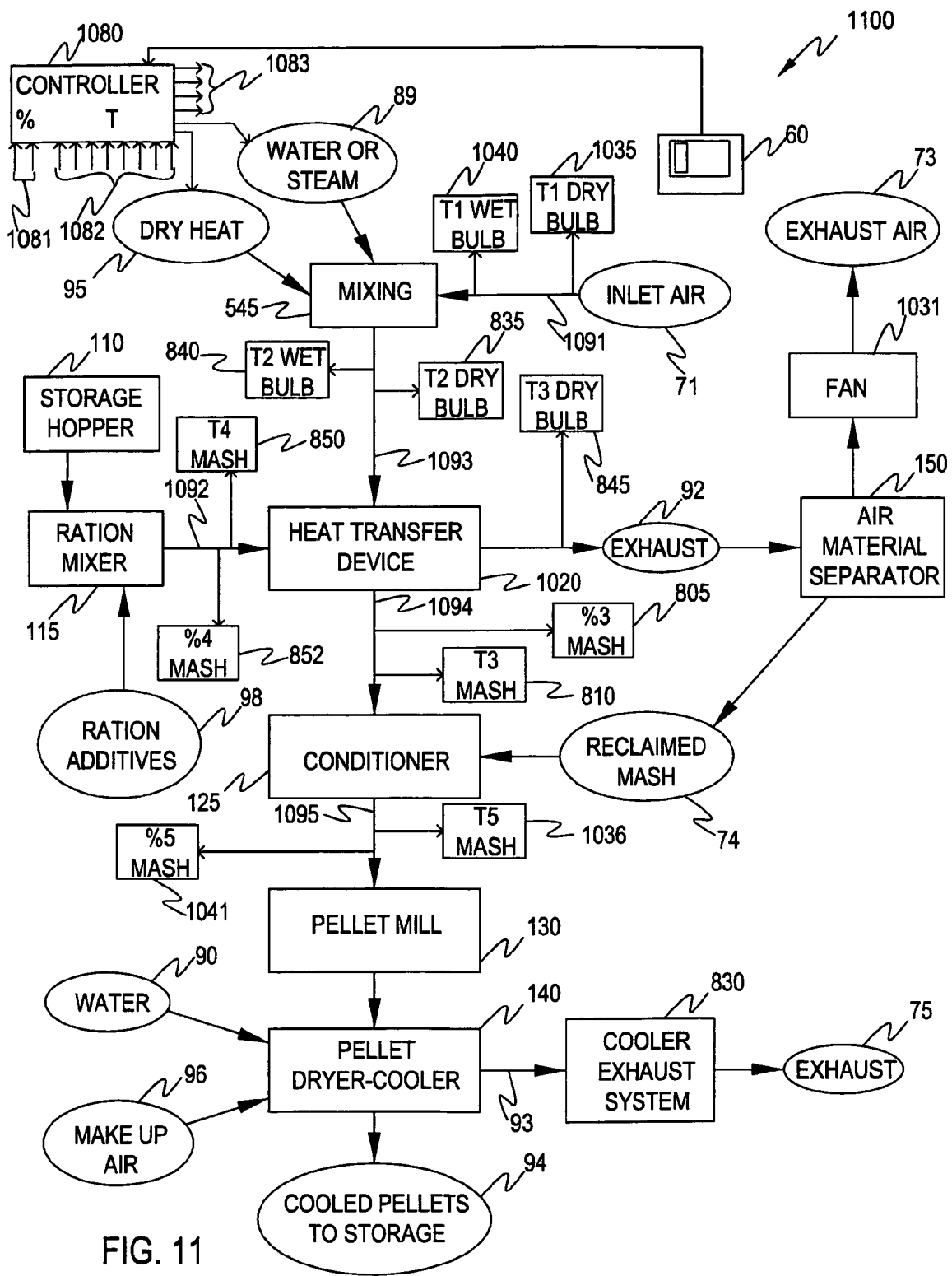
FIG. 11 is a block diagram of a system 1100 of some embodiments of the invention that provides agricultural-product production with improved heat and moisture control.

FIG. 11 is a block diagram of a system 1100 of some embodiments of the invention that provides agricultural-product production with improved heat and moisture control, but with little or no recirculation or recovery of heat and/or moisture. System 1100 is much the same as system 1000 of FIG. 10, except that inlet air 71 is not mixed with or added to recovered air 1090 from air-material separator 150, but is instead an independent source of air such as from the factory's fresh-air supply. All other aspects of system 1100 are the same as system 1000. The T1 wet-bulb sensor's signal 1040 and the T1 dry-bulb sensor's signal 1035 are input to controller 1080, which then adds water or steam 89 and dry heat 95 as needed in mixing station 545 to achieve the desired heat and moisture to air stream 1093 in order to achieve the desired heat and moisture content in mash 1094 before it enters conditioner 125.

In some embodiments, the present invention provides independent control of temperature, moisture content, and air volume of an air stream of heated moist air 1093. In some embodiments, preconditioner 1020 controls the amount of moisture added in order that the mash retains its granular characteristic. The conditioner 125 changes the mash characteristic to a warm thick paste, which is then easier to extrude through the pellet mill.

While the U.S. Pat. No. 4,929,163 describes benefits from providing independent control of mash temperature and moisture it does not provide a method for controlling the mash moisture at the pellet mill when the temperature and/or moisture of the mash entering the conditioner change. Further U.S. Pat. No. 4,929,163 asserts the inefficiency problems of direct steam use, it does not provide substantiation. Direct steam heating of mash is typically quite energy efficient in terms of heat transfer (total BTU's). The heat energy of the steam goes directly into the mash less any heat loss or system inefficiencies. The method of heating the mash proposed in U.S. Pat. No. 4,929,163 requires heating of air (either ambient or dry air) and using the air to heat the mash. Any and all energy used to heat the air, which is not transferred to the mash, is wasted energy. To the extent the air discharged from the conditioner is warmer and more moist then the ambient air the energy is wasted. Conditioners currently utilized in pellet applications are optimized for direct steam contacting with the mash and would be inefficient contacting devices for the high air flows required in U.S. Pat. No. 4,929,163 resulting in additional energy waste. U.S. Pat. No. 4,929,163 does not provide a method for recovering this waste energy. Additionally, U.S. Pat. No. 4,929,163 does not provide a method for recovering moisture and heat from the agricultural product output, thereby necessitating a larger cost expenditure in the production of agricultural products since this unrecovered moisture and heat goes to waste.

In contrast, some embodiments of the present invention provide independent control of dry bulb temperature 835, wet bulb temperature 840 and air volume of an air stream of heated moist air 1093. The dry bulb temperature, wet bulb temperature and/or air volume of the heated moist air are automatically adjusted to deliver the desired temperature 810 and moisture 805 of mash discharge 1094 issuing from the heat-transfer device 1020. By increasing the amount of make-up air 71, decreasing the amount of dry heat 95, adjusting the amount of steam and/or water 89, and/or adjusting the amount of recycled exhaust 1090, the dry-bulb temperature of heated moist air 1093 can be decreased. By decreasing the amount of make-up air 71, increasing the amount of dry heat 95, adjusting the amount of steam 89, and/or adjusting the amount of recycled exhaust 1090, the dry-bulb temperature of heated moist air 1093 can be increased. By decreasing the amount of steam and/or water 89, and/or decreasing the amount of recycled exhaust 1090, the moisture content of heated moist air 1093 can be decreased. By increasing the amount of steam and/or water 89, and/or increasing the amount of recycled exhaust 1090, the moisture content of heated moist air 1093 can be increased. Thus, by controlling two or more of the above parameters, both the temperature and moisture content can be independently set to their respective desired values, regardless of the other. In some embodiments, the volume of air flow can also be set independently. The sensed T4 temperature 850 and/or sensed %4 moisture content 852 of the incoming "dry" material 1092 are used by controller 1080 to set T2 wet-bulb temperature 840 substantially independent of T2 dry-bulb temperature 835, in order to achieve the desired T3 temperature 810 and %3 moisture content 805 for mash 1094. This ability to control and set both the temperature and moisture content of mash 1092 regardless of the ambient temperature and humidity and the mash temperature and moisture content provides a more consistent and higher quality output product, such as feed pellets.

In some embodiments, it is desirable to maintain a granular characteristic of mash 1094 in order that the heated moisturized air 1093 can pass through and achieve the desired heat and moisture transfer. In some embodiments, a screw conveyor in conditioner 125 compacts the mash and the cooking that occurs there even without adding steam in the conditioner will result in the desired mash consistency.

In some embodiments, the invention includes a computer-readable medium 60 (such as a diskette, CDROM, FLASH ROM with a USB plug, internet-connected data source, or the like) having control information (such as, for example, instructions, tables, formulae, state transitions, data structures, and/or the like) stored thereon for causing a suitable programmed apparatus, such as system 800, 1000 or 1100, to execute one or more of the methods described herein. For example, in some embodiments, controller 1080 of FIG. 11 or controller 160 of FIG. 6 includes a programmable computer (such as an IBM-compatible personal computer) that is coupled to read and obtain control information (such as instructions and/or data structures) from computer-readable medium 60, and coupled to control apparatus 1100 according to the instructions stored on the medium.

Concerning the temperature of the heated and moisturized air stream used for preheating the mash in the various embodiments described in FIGS. 1-11, the dry-bulb temperature of the heated moisturized air stream—prior to he direct contacting with material—would typically be between about 140 and 240 degrees F. (about 60 to 116 degrees C.), in some embodiments. This heated air may be considered to be "warm" or "hot," depending on the circumstances. However, the dry-bulb temperature selected and controlled by the controller for the heated moisturized air is quite dependent on the temperature of the incoming material, the mass of air relative to the mass of material, and the length of time or efficiency of contact. In some embodiments, a system, which does not use any heat recovery, operates at a higher dry bulb temperature (for example, about 300 to 400 degrees F., or about 149 to 205 degrees C.) and uses a smaller mass of air to deliver the same heat (BTUs or calories) input to the mash. In some embodiments, this is more dependent on the ability of the equipment to deliver good air/material contact, than on the process. In some embodiments, the control for using the elevated-temperature heated/moisturized air is basically the same as for the lower-temperature heated/moisturized air. In some embodiments, the method controls the actual dry-bulb and wet-bulb temperatures to provide the desired discharge temperature and moisture for the mash. At some temperature (e.g., somewhere above 400 F. (205 degrees C.) for some embodiments, depending on the material being heated) the high dry-bulb temperature would begin to chemically change or damage the mash (burn, brown, scorch, caramelize, and/or deteriorate proteins and/or vitamins, and the like). This chemical-change temperature value is dependent on the ration, and the chemical-change may or may not be detrimental to the finished product. At some temperature the damage would clearly be detrimental to the finished product.

In some embodiments, the dry-bulb temperature of the heated moisturized air stream used for preheating the mash—prior to he direct contacting with material—is controlled by the controller to be in a range of about 40 and about 45 degrees C. In some embodiments, the dry-bulb control range is between about 45 and about 50 degrees C. In some embodiments, the dry-bulb control range is between about 50 and about 55 degrees C. In some embodiments, the dry-bulb control range is between about 55 and about 60 degrees C. In some embodiments, the dry-bulb control range is between about 60 and about 65 degrees C. In some embodiments, the dry-bulb control range is between about 65 and about 70 degrees C. In some embodiments, the dry-bulb control range is between about 70 and about 75 degrees C. In some embodiments, the dry-bulb control range is between about 75 and about 80 degrees C. In some embodiments, the dry-bulb control range is between about 80 and about 85 degrees C. In some embodiments, the dry-bulb control range is between about 85 and about 90 degrees C. In some embodiments, the dry-bulb control range is between about 90 and about 95 degrees C. In some embodiments, the dry-bulb control range is between about 95 and about 100 degrees C. In some embodiments, the dry-bulb control range is between about 100 and about 105 degrees C. In some embodiments, the dry-bulb control range is between about 105 and about 110 degrees C. In some embodiments, the dry-bulb control range is between about 110 and about 115 degrees C. In some embodiments, the dry-bulb control range is between about 115 and about 120 degrees C. In some embodiments, the dry-bulb control range is between about 120 and about 125 degrees C. In some embodiments, the dry-bulb control range is between about 125 and about 130 degrees C. In some embodiments, the dry-bulb control range is between about 130 and about 135 degrees C. In some embodiments, the dry-bulb control range is between about 135 and about 140 degrees C. In some embodiments, the dry-bulb control range is between about 140 and about 145 degrees C. In some embodiments, the dry-bulb control range is between about 145 and about 150 degrees C. In some embodiments, the dry-bulb control range is between about 150 and about 155 degrees C. In some embodiments, the dry-bulb control range is between about 155 and about 160 degrees C. In some embodiments, the dry-bulb control range is between about 160 and about 165 degrees C. In some embodiments, the dry-bulb control range is between about 165 and about 170 degrees C. In some embodiments, the dry-bulb control range is between about 170 and about 175 degrees C. In some embodiments, the dry-bulb control range is between about 175 and about 180 degrees C. In some embodiments, the dry-bulb control range is between about 180 and about 185 degrees C. In some embodiments, the dry-bulb control range is between about 185 and about 190 degrees C. In some embodiments, the dry-bulb control range is between about 190 and about 195 degrees C. In some embodiments, the dry-bulb control range is between about 195 and about 200 degrees C. In some embodiments, the dry-bulb control range is between about 200 and about 205 degrees C. In some embodiments, the dry-bulb control range is between about 205 and about 210 degrees C. In some embodiments, the dry-bulb control range includes temperatures above about 210 degrees C. In some embodiments, the dry-bulb control range is controlled by the controller to be at a selected variable temperature within two or more adjacent ones of the above ranges.

Some embodiments of the invention provide a method that includes pre-conditioning an agricultural material by direct contact with a mixture of heated air and moisture to form preconditioned agricultural material that is warmed and moisturized and a first exhaust stream that is cooler and drier than the mixture of heated air and moisture, measuring a plurality of temperatures of air flows and material, and controlling the mixture of warm air and moisture in order to control a temperature and a moisture content of the preconditioned material based on the measured temperatures, steam conditioning the agricultural material, processing the steam-conditioned material into warm processed product, and cooling the warm processed product with air to produce cooled processed product and warm moist air of a second exhaust stream.

Some embodiments of the method further include adding heat and moisture from the second exhaust stream to produce at least a portion of the mixture of warm air and moisture used to precondition the incoming agricultural material.

Some embodiments of the method further include mixing controlled amounts of dry heat and liquid water to an air stream in order to obtain the mixture of heated air and moisture prior to contact with the agricultural material.

Some embodiments of the method further include mixing controlled amounts of dry heat and steam to an air stream in order to obtain the mixture of heated air and moisture prior to contact with the agricultural material.

Some embodiments of the method further include measuring a moisture amount that results from the cooling, and based at least in part on the moisture-amount measurement, controlling the mixture of heated air and moisture.

In some embodiments, the processing of the steam-conditioned material includes pelletizing and the processed product includes warm pellets, and further comprising spraying water on the warm pellets before cooling in order to improve a pellet durability index (PDI).

Some embodiments of the method further include providing a flow of incoming air that has a temperature and moisture content, measuring the temperature and moisture content of the incoming air, adding heat and moisture to the incoming air to produce the mixture of heated air and moisture, providing a flow of incoming agricultural material that has a temperature and moisture content, measuring the temperature and moisture content of the incoming agricultural material before the pre-conditioning, measuring the temperature and moisture content of the pre-conditioned agricultural material after the pre-conditioning, and controlling the adding of heat and moisture to the incoming air based on the temperature and moisture measurements of the incoming air, the temperature and moisture measurements of the incoming agricultural material, and the temperature and moisture measurements of the pre-conditioned agricultural material.

Some embodiments of the method further include recovering at least some of the first exhaust to provide at least part of the flow of incoming air.

In some embodiments, the processing of the steam-conditioned material includes fermenting and the processed product includes ethanol.

Some embodiments of the method further include providing raw material, grinding the raw material to produce mash, mixing one or more rations into the mash to produce the incoming agricultural material, wherein the processing includes pelletizing.

Some embodiments of the invention include an apparatus that includes a mixing unit that adds controlled amounts of heat and moisture to an incoming air stream to generate a heated moisturized air stream, a moisture-and-heat-transfer unit that provides direct contact transfer between an incoming agricultural product mash and the heated moisturized air stream, and that outputs warm mash and a first exhaust stream, an agricultural-product processor operatively coupled to receive warm mash and that outputs a warm, moist processed product, an agricultural-product dryer/cooler operatively coupled to receive the warm, moist product and that outputs cooled product, and a controller operatively coupled to receive temperature and moisture parameters from a plurality of locations in the apparatus and, based on the parameters, coupled to the mixing unit to control the amounts of heat and moisture added to the incoming air stream.

Some embodiments of the apparatus further include a steam conditioner operatively coupled to receive the warmed, moisturized mash from the moisture-and-heat-transfer unit and that injects steam before passing the mash to the agricultural-product processor.

In some embodiments, the processed product includes warm pellets, and further comprising a pellet wetter coupled to place water on the warm pellets before the pellets exit the dryer/cooler.

In some embodiments, the controller is operatively coupled to adjust an amount of water sprayed by the sprayer.

Some embodiments of the apparatus further include a flow controller wherein the controller adjusts an amount of flow of air through the moisture-and-heat-transfer unit.

In some embodiments, the agricultural-product processor is a pellet mill and the agricultural-product dryer/cooler is a pellet dryer/cooler.

In some embodiments, the agricultural-product processor is an ethanol-processor and the agricultural-product dryer/cooler is an ethanol byproduct dryer/cooler.

In some embodiments, the agricultural-product processor is a wet-corn starch processor and the agricultural-product dryer/cooler is a dryer/cooler of an output byproduct of wet corn processing.

In some embodiments, the controller controls a pellet sprayer and a flow of air through the agricultural-product dryer/cooler in order to produce pellets having a moisture content of about 15 percent.

Some embodiments of the apparatus further include a recirculation path that receives the first exhaust stream and that generates the incoming air stream at least in part from the first exhaust stream.

Some embodiments of the invention include an apparatus that includes a mixing unit that adds controlled amounts of heat and moisture to an incoming air stream to generate a warmed moisturized air stream, a moisture-and-heat-transfer unit that provides direct contact transfer between an incoming agricultural product mash and the warmed moisturized air stream, and that outputs warm mash and a first exhaust stream, means as described herein for measuring a plurality of temperatures of air flows and material, and for controlling the mixture of warm air and moisture in order to control a temperature and a moisture content of the preconditioned material based on the measured temperatures an agricultural-product processor operatively coupled to receive warm mash and that outputs a warm, moist processed product, and an agricultural-product dryer/cooler operatively coupled to receive the warm, moist product and that outputs cooled product and a warm moist second exhaust stream.

Some embodiments of this apparatus further include means for adding heat and moisture from the second exhaust stream to form the mixture of heated air and moisture used to precondition the incoming agricultural material.

Some embodiments further include a steam conditioner operatively coupled to receive the warmed, moisturized mash from the moisture-and-heat-transfer unit and that injects steam before passing the mash to the agricultural-product processor.

In some embodiments, a moisture transfer in the moisture-and-heat-transfer unit is about two points of water and moisture transfer in the steam conditioner is also about two points.

Some embodiments further include means for mixing controlled amounts of dry heat and steam to an air stream in order to obtain the mixture of heated air and moisture prior to contact with the agricultural material. Some embodiments further include means for measuring a moisture amount that results from the cooling, and based at least in part on the moisture-amount measurement, for controlling the mixture of heated air and moisture.

Some embodiments further include means for providing a flow of incoming air that has a temperature and moisture content, means for measuring the temperature and moisture content of the incoming air, means for adding heat and moisture to the incoming air to produce the mixture of heated air and moisture, means for providing a flow of incoming agricultural material that has a temperature and moisture content, means for measuring the temperature and moisture content of the incoming agricultural material before the pre-conditioning, means for measuring the temperature and moisture content of the pre-conditioned agricultural material after the pre-conditioning, and means for controlling the adding of heat and moisture to the incoming air based on the temperature and moisture measurements of the incoming air, the temperature and moisture measurements of the incoming agricultural material, and the temperature and moisture measurements of the pre-conditioned agricultural material.

Some embodiments further include means for recovering at least some of the first exhaust to provide at least part of the flow of incoming air.

In some embodiments, the agricultural-product processor is an ethanol-processor and the agricultural-product dryer/cooler is an ethanol-byproduct dryer/cooler.

In some embodiments, the agricultural-product processor is a wet-corn starch processor and the agricultural-product dryer/cooler is a dryer/cooler of an output product or byproduct of wet corn processing.

In some embodiments, the agricultural-product processor includes a pelletizer and the processed product includes warm pellets, and further comprising means for wetting the warm pellets before cooling in order to improve a pellet durability index (PDI).

In some embodiments, the means for measuring and for controlling controls an air flow through the cooler/dryer and further including means for wetting pellets in order to produce pellets having a predetermined moisture content.

One aspect of the invention, in some embodiments, includes a method 500 that includes transferring 520 heat and moisture from a warm, moist air exhaust stream to incoming agricultural material, steam conditioning 525 the material, processing 530 the steam-conditioned material into warm processed product, and cooling 540 the warm processed product with air to produce the warm, moist exhaust air 93 used in the transferring of heat to the incoming material and to produce cooled processed product, wherein the cooled processed product is at a temperature lower than the warm, moist exhaust air.

In some embodiments of the invention, processing 530 of the steam-conditioned material includes pelletizing and the processed product includes warm pellets, and also includes wetting 535 the warm pellets before cooling in order to improve a pellet durability index (PDI).

In some embodiments, the method includes adding 545 a controlled amount of dry, heated air based on temperature of exhaust air.

In some embodiments, the method includes varying 555 a flow rate of air in the cooling of the pellets. In some such embodiments, the flow rate is lowered based on a lower ambient air temperature, wherein slowing air flow allows a greater percent of moisture content.

In some embodiments, the method includes receiving one or more measured parameters and generating one or more control signals to control one or more of the transferring, steam conditioning, processing, and cooling.

In some such embodiments, the processing of the steam-conditioned material includes fermenting and the processed product includes ethanol.

In some embodiments, the method includes providing raw material, grinding the raw material to produce mash, mixing one or more rations into the mash to produce the incoming agricultural material, wherein the processing includes pelletizing.

In some embodiments, the method includes cyclone cleaning of the warm, moist exhaust air used in the transferring of heat to the incoming material.

In some embodiments of the invention, the transferring of heat and moisture adds about two points of water and steam conditioning adds about two points of water.

Another aspect of the invention, in some embodiments, includes a method 500 including transferring 520 heat and moisture from a warm, moist air exhaust stream to incoming agricultural material, steam conditioning 525 the material, processing 530 the steam-conditioned material into warm processed product, cooling 540 the warm processed product with air to produce the warm, moist exhaust air used in the transferring of heat to the incoming material and to produce cooled processed product, and controlling 560 including measuring a parameter related to heat and moisture content and varying an apparatus related to heat and moisture content within the method.

In some embodiments, the processing 530 of the steam-conditioned material includes pelletizing and the processed product includes warm pellets, and the method 500 includes wetting the warm pellets before the cooling 540 in order to improve a pellet durability index (PDI).

In some embodiments, the method 500 includes adding 545 under the control of the controller a controlled amount of dry, heated air based on temperature of exhaust air.

In some embodiments of the invention, the method includes varying 155 a flow rate of air in the cooling of the pellets. In some such embodiments, the flow rate is lowered based on a lower ambient air temperature, wherein slowing airflow allows a greater moisture content.

In some embodiments, the method includes receiving one or more measured parameters and generating one or more control signals to control one or more of the transferring, steam conditioning, processing, drying and cooling.

In some embodiments of the invention, the processing of the steam-conditioned material includes fermenting and the processed product includes ethanol.

In some embodiments, the method 500 includes providing raw material, grinding 505 the raw material to produce mash, mixing 515 one or more rations into the mash to produce the incoming agricultural material, wherein the processing 530 includes pelletizing and wherein the grinding, mixing, and processing are under the control of the controller.

In some embodiments of the invention, the method includes cyclone cleaning 550 under the control of the controller of the cooled, dried exhaust air used in the transferring of heat to the incoming material.

In some embodiments, the transferring 520 of heat and moisture adds about two points of water and the steam conditioning 525 adds about two points of water.

Another aspect of the invention includes an apparatus 100 including a moisture-and-heat-recovery system 120 that provides direct contact between an incoming agricultural product mash and a warm, moist exhaust, a steam conditioner 125 operatively coupled to receive the warmed, moisturized mash from the moisture-and-heat-recovery system 120 and that injects steam, an agricultural-product processor (e.g., 130) operatively coupled to receive steam-injected warm mash and that outputs a warm, moist processed product, and an agricultural-product dryer/cooler 140 operatively coupled to receive the warm, moist product and that outputs cooled product at a temperature lower than the warm, moist exhaust.

In some embodiments of the invention, the processed product includes warm pellets, and the apparatus includes a pellet wetter 135 coupled to place water on the warm pellets before the pellets exit the dryer/cooler.

In some embodiments, the apparatus includes a controller 160 operatively coupled to adjust an amount of water sprayed by the sprayer.

In some embodiments of the invention, the apparatus includes a flow controller 155 wherein the controller 160 adjusts an amount of flow of air through the agricultural-product dryer/cooler 140.

In some embodiments, the agricultural-product processor is a pellet mill and the agricultural-product dryer/cooler includes a pellet dryer/cooler 135.

In some other embodiments, the agricultural-product processor is an ethanol-processor and the agricultural-product dryer/cooler is an ethanol byproduct dryer/cooler.

In still other embodiments, the agricultural-product processor 140 includes a wet-corn starch processor and the agricultural-product dryer/cooler is a cooler of an output byproduct of wet corn processing.

In some embodiments, the apparatus includes a controller that controls the flow controller and pellet wetter in order to produce pellets having a moisture content of about 15 percent.

In some embodiments, a moisture transfer is about two points of water in the moisture-and-heat-recovery system 120, and steam adds about two points of water.

In some embodiments, the apparatus includes a mixer 145 operatively coupled to the warm, moist exhaust to add a controlled amount of dry, heated air and a controlled amount of moisture based on temperature of the exhaust.

Another aspect of the invention, in some embodiments, includes an apparatus 100 including a moisture-and-heat-recovery system 120 that provides direct contact between an incoming agricultural product mash and a warm, moist exhaust, a steam conditioner 125 operatively coupled to receive the warmed, moisturized mash from the moisture-and-heat-recovery system and that injects steam, an agricultural-product processor (e.g., 130) operatively coupled to receive steam-injected warm mash and that outputs a warm, moist processed product, an agricultural-product dryer/cooler 140 operatively coupled to receive the warm, moist product and that outputs cooled product, and a controller operatively coupled to dynamically adjust an amount of heat and/or moisture transferred based on a measured air temperature.

In some embodiments, the processed product includes warm pellets, and the apparatus includes a pellet wetter 135 controlled by the controller and coupled to place water on the warm pellets before the pellets exit the dryer/cooler.

In some embodiments, the apparatus includes a controller 160 operatively coupled to adjust an amount of water deposited by the wetter.

In some embodiments, the apparatus includes a flow controller 155 wherein the controller 160 adjusts an amount of flow of air through the agricultural-product dryer/cooler 140.

In some embodiments of the invention, the agricultural-product processor is a pellet mill 130 and the agricultural-product dryer/cooler is a pellet dryer/cooler 140.

In some other embodiments, the agricultural-product processor is an ethanol-processor and the agricultural-product dryer/cooler is an ethanol byproduct dryer/cooler.

In still other embodiments, the agricultural-product processor is a wet-corn starch processor and the agricultural-product dryer/cooler is a dryer/cooler of an output byproduct of wet corn processing.

In some embodiments of the invention, the controller 160 controls the flow controller 155 and pellet wetter 135 in order to produce pellets having a moisture content of about 15 percent.

In some embodiments, a moisture transfer is about two points of water in the moisture-and-heat-recovery system 120, and steam adds about two points of water In some embodiments, the apparatus includes a mixer 145 controlled by the controller 160 and operatively coupled to the warm, moist exhaust to add a controlled amount of dry, heated air and a controlled amount of moisture based on temperature of the exhaust 93.

Another aspect of the invention, in some embodiments, includes an apparatus 100 including a steam conditioner 125 that adds heat and moisture to an incoming mash, an agricultural-product processor 130 coupled to receive the heated, moisturized mash and generate hot, moist processed product, and means for recovering heat and moisture from pellets and transferring the heat and moisture to an incoming material stream to produce the incoming mash.

In some embodiments, the apparatus includes means for placing water on the warm pellets before cooling in order to improve a pellet durability index (PDI). In some embodiments, the apparatus includes means for adding a variable amount of dry heated air based on temperature of exhaust air. In some embodiments of the invention, the apparatus includes means for varying a flow of air in the cooling of the pellets. In some such embodiments, the means for varying the flow rate bases the lowered flow rate on a lowered ambient air temperature.

In some embodiments, the apparatus includes means for controlling by a controller coupled to receive one or more measured parameters and generating one or more control signals to control one or more of the transferring, steam conditioning, processing, and cooling.

In some embodiments of the invention, the means for processing of the steam-conditioned material includes fermenting and the processed product includes ethanol.

In some embodiments, the apparatus includes means for providing raw material, grinding the raw material to produce mash, and mixing one or more rations into the mash to produce the incoming agricultural material, wherein the processing includes pelletizing.

In some embodiments of the invention, the apparatus includes means for cyclone cleaning of the warm, moist exhaust air used in the transferring of heat to the incoming material.

In some embodiments, the means for transferring of heat and moisture adds about two points of water and steam conditioning adds about two points of water.

In some embodiments of the invention, the means for recovering heat and moisture includes controlling the means for adjusting one or more parameters.

In some embodiments, the means for recovering heat and moisture includes counter-flow means for extracting heat from a cooling product and inserting heat and moisture to the incoming product.

Another aspect of the invention, in some embodiments, includes a computer-readable medium having control information stored thereon for causing a suitably programmed agricultural-material-processing system to execute a method that includes pre-conditioning an agricultural material by direct contact with a mixture of heated air and moisture to form preconditioned agricultural material that is warmed and moisturized and a first exhaust stream that is cooler and drier than the mixture of heated air and moisture, measuring a plurality of temperatures of air flows and material, and controlling the mixture of warm air and moisture in order to control a temperature and a moisture content of the preconditioned material based on the measured temperatures, conditioning the agricultural material at a predetermined temperature profile over a pre-determined period of time, processing the conditioned material into warm processed product, and cooling the warm processed product with air to produce cooled processed product and warm moist air of a second exhaust stream.

In some embodiments, the medium further includes control information that causes the method to further include adding heat and moisture from the second exhaust stream to produce at least a portion of the mixture of warm air and moisture used to precondition the incoming agricultural material.

In some embodiments, the medium further includes control information that causes the method to further include mixing controlled amounts of dry heat and liquid water to an air stream in order to obtain the mixture of heated air and moisture prior to contact with the agricultural material.

In some embodiments, the medium further includes control information that causes the method to further include mixing controlled amounts of dry heat and steam to an air stream in order to obtain the mixture of heated air and moisture prior to contact with the agricultural material.

In some embodiments, the medium further includes control information that causes the method to further include providing time-at-temperature conditioning of the mash.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. A method comprising:
pre-conditioning an agricultural material by direct contact with a mixture of heated air and moisture to form pre-conditioned agricultural material that is warmed and moisturized and a first exhaust stream that is cooler and drier than the mixture of heated air and moisture, wherein the moisture includes water vapor extracted from a material being cooled and dried;
measuring a plurality of temperatures of air flows and material, and controlling the mixture of heated air and moisture in order to control a temperature and a moisture content of the preconditioned material based on the measured temperatures;
conditioning the agricultural material for a pre-determined period of time;
processing the conditioned material into warm processed product; and
cooling the warm processed product with air to produce cooled processed product and warm moist air of a second exhaust stream.

2. A method comprising:
pre-conditioning an agricultural material by direct contact with a mixture of heated air and moisture to form pre-conditioned agricultural material that is warmed and moisturized and a first exhaust stream that is cooler and drier than the mixture of heated air and moisture;
measuring a plurality of temperatures of air flows and material, and controlling the mixture of heated air and moisture in order to control a temperature and a moisture content of the preconditioned material based on the measured temperatures;
conditioning the agricultural material for a pre-determined period of time;
processing the conditioned material into warm processed product;
cooling the warm processed product with air to produce cooled processed product and warm moist air of a second exhaust stream; and
adding heat and moisture from the second exhaust stream to produce at least a portion of the mixture of heated air and moisture used to precondition the incoming agricultural material.

3. The method of claim 1, further comprising mixing controlled amounts of dry heat and liquid water to an air stream in order to obtain the mixture of heated air and moisture prior to contact with the agricultural material.

4. The method of claim 1, further comprising mixing controlled amounts of dry heat and steam to an air stream in order to obtain the mixture of heated air and moisture prior to contact with the agricultural material.

5. The method of claim 1, further comprising
measuring a moisture amount that results from the cooling, and based at least in part on the moisture-amount measurement, controlling the mixture of heated air and moisture.

6. The method of claim 1, further comprising receiving at least one measured parameter and to generating at least one control signals to control at least one of the transferring, conditioning, processing, and cooling.

7. The method of claim 1, further comprising:
providing a flow of incoming air that has a temperature and moisture content;
measuring the temperature and moisture content of the incoming air;
adding heat and moisture to the incoming air to produce the mixture of heated air and moisture;
providing a flow of incoming agricultural material that has a temperature and moisture content;
measuring the temperature and moisture content of the incoming agricultural material before the pre-conditioning;
measuring the temperature and moisture content of the pre-conditioned agricultural material after the pre-conditioning; and
controlling the adding of heat and moisture to the incoming air based on the temperature and moisture measurements of the incoming air, the temperature and moisture measurements of the incoming agricultural material, and the temperature and moisture measurements of the pre-conditioned agricultural material.

8. The method of claim 7, further comprising:
recovering at least some of the first exhaust to provide at least part of the flow of incoming air.

9. The method of claim 1, wherein the processing of the conditioned material includes fermenting and the processed product includes ethanol.

10. The method of claim 1, wherein the pre-conditioning includes transferring of heat and moisture that adds about two points of water and wherein the conditioning includes steam conditioning that adds about two points of water.

11. A computer-readable medium having control information stored thereon for causing a suitably programmed agricultural-material-processing system to execute a method comprising:
pre-conditioning an agricultural material by direct contact with a mixture of heated air and moisture to form pre-conditioned agricultural material that is warmed and moisturized and a first exhaust stream that is cooler and drier than the mixture of heated air and moisture, wherein the moisture includes water vapor extracted from a material being cooled and dried;
measuring a plurality of temperatures of air flows and material, and controlling the mixture of heated air and moisture in order to control a temperature and a moisture content of the preconditioned material based on the measured temperatures;
conditioning the agricultural material for a pre-determined period of time;
processing the conditioned material into warm processed product; and
cooling the warm processed product with air to produce cooled processed product and warm moist air of a second exhaust stream.

12. A computer-readable medium having control information stored thereon for causing a suitably programmed agricultural-material-processing system to execute a method comprising:
pre-conditioning an agricultural material by direct contact with a mixture of heated air and moisture to form pre-conditioned agricultural material that is warmed and moisturized and a first exhaust stream that is cooler and drier than the mixture of heated air and moisture;
measuring a plurality of temperatures of air flows and material, and controlling the mixture of heated air and moisture in order to control a temperature and a moisture content of the preconditioned material based on the measured temperatures;
conditioning the agricultural material for a pre-determined period of time;
processing the conditioned material into warm processed product;
cooling the warm processed product with air to produce cooled processed product and warm moist air of a second exhaust stream; and
adding heat and moisture from the second exhaust stream to produce at least a portion of the mixture of heated air and moisture used to precondition the incoming agricultural material.

13. The medium of claim 11, further comprising control information that causes the method to further include mixing controlled amounts of dry heat and liquid water to an air stream in order to obtain the mixture of heated air and moisture prior to contact with the agricultural material.

14. The medium of claim 11, further comprising control information that causes the method to further include mixing controlled amounts of dry heat and steam to an air stream in order to obtain the mixture of heated air and moisture prior to contact with the agricultural material.

15. The medium of claim 11, further comprising control information that causes the method to further include providing time-at-temperature conditioning of the agricultural material.

16. The method of claim 1, further comprising mixing controlled amounts of dry heat to warm, moist air from a cooling and drying operation in order to obtain the mixture of heated air and moisture prior to contact with the agricultural material.

17. The method of claim 1, wherein the pre-conditioning includes transferring of heat and moisture that adds about four points of water and wherein the conditioning includes steam conditioning that adds about four points of water.

18. The method of claim 2, further comprising mixing controlled amounts of dry heat and liquid water to an air stream in order to obtain the mixture of heated air and moisture prior to contact with the agricultural material.

19. The method of claim 2, further comprising mixing controlled amounts of dry heat and steam to an air stream in order to obtain the mixture of heated air and moisture prior to contact with the agricultural material.

20. The method of claim 2, further comprising
measuring a moisture amount that results from the cooling, and based at least in part on the moisture-amount measurement, controlling the mixture of heated air and moisture.

21. The method of claim 2, further comprising receiving at least one measured parameter and to generating at least one control signals to control at least one of the transferring, conditioning, processing, and cooling.

22. The method of claim 2, further comprising:
providing a flow of incoming air that has a temperature and moisture content;
measuring the temperature and moisture content of the incoming air;
adding heat and moisture to the incoming air to produce the mixture of heated air and moisture;
providing a flow of incoming agricultural material that has a temperature and moisture content;
measuring the temperature and moisture content of the incoming agricultural material before the pre-conditioning;
measuring the temperature and moisture content of the pre-conditioned agricultural material after the pre-conditioning; and
controlling the adding of heat and moisture to the incoming air based on the temperature and moisture measurements of the incoming air, the temperature and moisture measurements of the incoming agricultural material, and the temperature and moisture measurements of the pre-conditioned agricultural material.

23. The method of claim 22, further comprising:
recovering at least some of the first exhaust to provide at least part of the flow of incoming air.

24. The method of claim 2, wherein the processing of the conditioned material includes fermenting and the processed product includes ethanol.

25. The method of claim 2, wherein the pre-conditioning includes transferring of heat and moisture that adds about two points of water and wherein the conditioning includes steam conditioning that adds about two points of water.

26. The method of claim 2, further comprising mixing controlled amounts of dry heat to warm, moist air from a cooling and drying operation in order to obtain the mixture of heated air and moisture prior to contact with the agricultural material.

27. The method of claim 2, wherein the pre-conditioning includes transferring of heat and moisture that adds about four points of water and wherein the conditioning includes steam conditioning that adds about four points of water.

28. The medium of claim 12 further comprising control information that causes the method to further include mixing controlled amounts of dry heat and liquid water to an air stream in order to obtain the mixture of heated air and moisture prior to contact with the agricultural material.

29. The medium of claim 12 further comprising control information that causes the method to further include mixing controlled amounts of dry heat and steam to an air stream in order to obtain the mixture of heated air and moisture prior to contact with the agricultural material.

30. The medium of claim 12 further comprising control information that causes the method to further include measuring a moisture amount that results from the cooling, and based at least in part on the moisture-amount measurement, controlling the mixture of heated air and moisture.

31. The medium of claim 12 further comprising control information that causes the method to further include receiving at least one measured parameter and to generating at least one control signals to control at least one of the transferring, conditioning, processing, and cooling.

32. The medium of claim 12 further comprising control information that causes the method to further include:
providing a flow of incoming air that has a temperature and moisture content;
measuring the temperature and moisture content of the incoming air;
adding heat and moisture to the incoming air to produce the mixture of heated air and moisture;
providing a flow of incoming agricultural material that has a temperature and moisture content;
measuring the temperature and moisture content of the incoming agricultural material before the pre-conditioning;
measuring the temperature and moisture content of the pre-conditioned agricultural material after the pre-conditioning; and
controlling the adding of heat and moisture to the incoming air based on the temperature and moisture measurements of the incoming air, the temperature and moisture measurements of the incoming agricultural material, and the temperature and moisture measurements of the pre-conditioned agricultural material.

33. The medium of claim 32 further comprising control information that causes the method to further include:
recovering at least some of the first exhaust to provide at least part of the flow of incoming air.

34. The medium of claim 12, wherein the processing of the conditioned material includes fermenting and the processed product includes ethanol.

35. The medium of claim 12, wherein the pre-conditioning includes transferring of heat and moisture that adds about two points of water and wherein the conditioning includes steam conditioning that adds about two points of water.

36. The medium of claim 12 further comprising control information that causes the method to further include mixing controlled amounts of dry heat to warm, moist air from a cooling and drying operation in order to obtain the mixture of heated air and moisture prior to contact with the agricultural material.

37. The medium of claim 12, wherein the pre-conditioning includes transferring of heat and moisture that adds about four points of water and wherein the conditioning includes steam conditioning that adds about four points of water.

38. The medium of claim 12 further comprising control information that causes the method to further include providing time-at-temperature conditioning of the agricultural material.

* * * * *